United States Patent
Yang et al.

(10) Patent No.: US 7,535,980 B2
(45) Date of Patent: *May 19, 2009

(54) SELECTIVELY DISABLING INTERFERENCE CANCELLATION BASED ON CHANNEL DISPERSION ESTIMATION

(75) Inventors: Baoguo Yang, San Jose, CA (US); Huaiyu (Hanks) Zeng, Red Bank, NJ (US)

(73) Assignee: Broadcom Corporation, Irvine, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/151,030

(22) Filed: Jun. 13, 2005

(65) Prior Publication Data

US 2006/0210003 A1    Sep. 21, 2006

Related U.S. Application Data

(60) Provisional application No. 60/678,996, filed on May 9, 2005, provisional application No. 60/657,564, filed on Mar. 1, 2005.

(51) Int. Cl.
*H04B 1/10* (2006.01)
(52) U.S. Cl. .................................................. 375/350
(58) Field of Classification Search ......... 375/231–236, 375/340, 346, 348–350
See application file for complete search history.

(56) References Cited

U.S. PATENT DOCUMENTS

| 2004/0127164 A1* | 7/2004 | Mondragon-Torres et al. ............... 455/67.11 |
| 2006/0198362 A1* | 9/2006 | Molev-Shteiman et al. . 370/352 |

* cited by examiner

*Primary Examiner*—Don N Vo
(74) *Attorney, Agent, or Firm*—Garlick Harrison & Markison; Bruce E. Garlick; Holly L. Rudnick

(57) ABSTRACT

This invention provides channel dispersion estimation algorithm(s). This channel dispersion estimation algorithm(s) may be implemented within a channel length estimation module of a single-branch or multi-branch equalizer processing module that enables interference cancellation when the channel length or channel delay spread associated with received radio frequency (RF) bursts compares unfavorably to predetermined thresholds. The channel dispersion estimation algorithm identifies when the radio frequency (RF) bursts have a channel length or channel delay spread that can affect receiver performance. The channel length estimation module may disable interference cancellation in response to such a channel length or channel delay spread. Additionally, the channel length estimation module may adjust the number of equalizer states for the single-branch or first branch of a multi-branch equalizer based the channel length or channel delay spread. The multi-branch equalizer improves the signal-to-noise ratio by improving the equalization by selectively disabling interference cancellation and adjusting the number of equalizer states for the single-branch or first branch equalizer.

20 Claims, 18 Drawing Sheets

SELECTIVELY DISABLING INTERFERENCE CANCELLATION BASED ON CHANNEL DISPERSION ESTIMATION

CROSS REFERENCES TO RELATED APPLICATIONS

This application claims the benefit of priority to and incorporates herein by reference in its entirety for all purposes, U.S. Provisional Patent Application No. 60/657,564 entitled "SINGLE ANTENNA INTERFERENCE CANCELLATION IN A CELLULAR TELEPHONE," by Hanks Zeng, et al. filed on Mar. 1, 2005. This application also claims the benefit of priority to and incorporates herein by reference in its entirety for all purposes, U.S. Provisional Patent Application No. 60/678,996 entitled "SELECTIVELY DISABLING INTERFERENCE CANCELLATION BASED ON CHANNEL DISPERSION ESTIMATION," by Baoguo Yang, et al. filed on May 9, 2005.

TECHNICAL FIELD OF THE INVENTION

The present invention relates generally to cellular wireless communication systems, and more particularly to the cancellation of interference, which may include colored noise, associated with received data communications processed by a wireless terminal within a wireless communication system.

BACKGROUND OF THE INVENTION

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions.

Wireless links between base stations and their serviced wireless terminals typically operate according to one (or more) of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application.

To a cellular telephone operating in a receive mode, co-channel and adjacent channel GMSK/8PSK signals appear as colored noise. Further, co-channel and adjacent channel GMSK signals may appear as noise to the cellular telephone receiver operating in the receive mode. In order to better receive the information intended for the cellular telephone, the cellular telephone must attempt to cancel these interference signals. Prior techniques for canceling such interference included channel equalization for received symbols. However, existing channel equalization techniques fail to typically remove co-channel and adjacent channel noise sufficiently. Thus, a need exists for improvements in interference cancellation.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGS., like numerals being used to refer to like and corresponding parts of the various drawings.

Gaussian Minimum Shift Keying (GMSK) modulation systems can be modeled as a single-input two-output system in real domain. This model is a virtual single transmit 2 receive system. Interference cancellation techniques for multiple antennas can be applied to GMSK systems as provided by embodiments of the present invention that substantially addresses the above identified needs as well as other needs. The present invention provides a multi-branch equalizer processing module operable to cancel interference associated with received radio frequency (RF) burst(s). This multi-branch equalizer processing module includes multiple equalizer processing branches. One equalizer processing branch is operable to be trained based upon known training sequences and equalize the received RF burst. These results are then further processed and used to train a second equalizer processing branch. The second equalizer processing branch then equalizes the received RF burst to produce an output based on canceling the interfering signals that results in improved processing of the received RF bursts.

Figure 1:
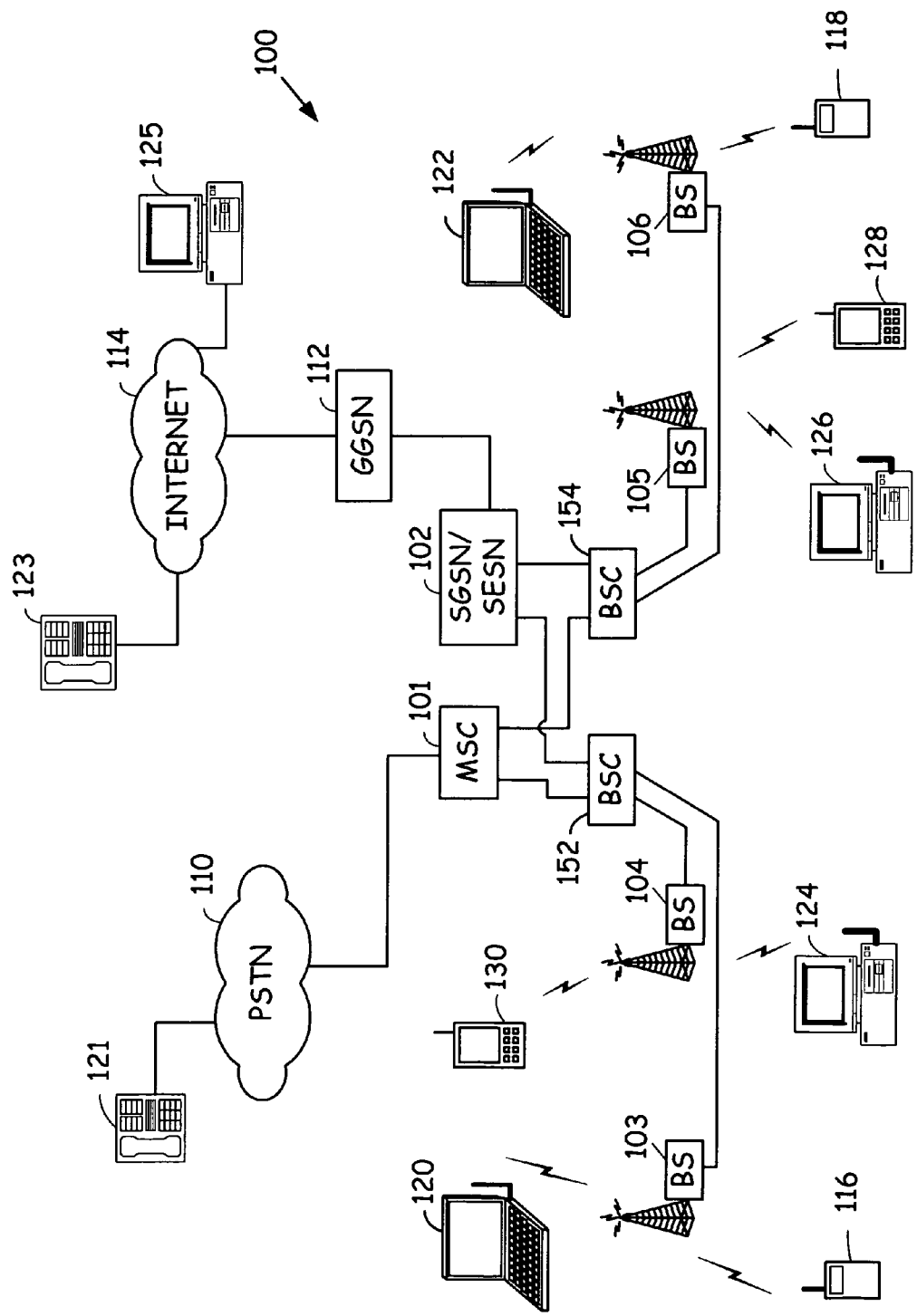
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating in accordance with embodiments of the present invention. Cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 402 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links can result in co-channel and adjacent channel signals that may appear as noise which may be colored or white. As previously stated, this noise may interfere with the desired signal of interest. Hence, the present invention provides techniques for canceling such interference in poor signal-to-noise ratio (SNR) or low signal-to-interference ratio (SIR) environments.

These wireless links may support digital data communications, VoIP communications, and other digital multimedia communications. The cellular wireless communication system 100 may also be backward compatible in supporting analog operations as well. The cellular wireless communication system 100 may support the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communication techniques that address the identification and cancellation of interfering communications.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard. These wireless terminals 116-130 also support the GSM standard and may support the GPRS standard.

Figure 2:
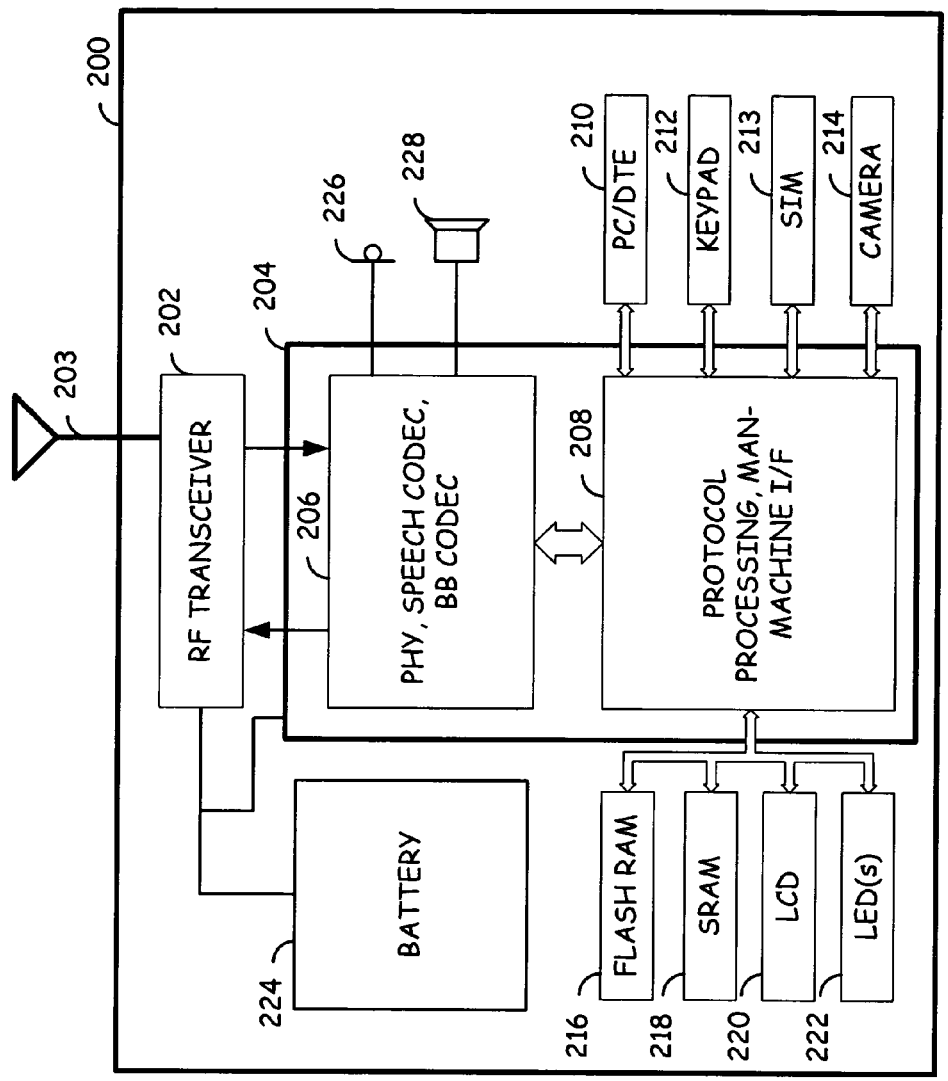
FIG. 2 is a block diagram functionally illustrating a wireless terminal constructed according to the present invention.

FIG. 2 is a block diagram functionally illustrating wireless terminal 200. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

RF transceiver 202 couples to an antenna 203, to the digital processing components 204, and also to battery 224 that powers all components of wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to various components such as, but not limited to, Personal Computing/Data Terminal Equipment interface 210, keypad 212, Subscriber Identification Module (SIM) port 213, a camera 214, flash RAM 216, SRAM 218, LCD 220, and LED(s) 222. When camera 214 and LCD 220 are present, these components may support either/both still pictures and moving pictures. Thus, the wireless terminal 200 of FIG. 2 may be operable to support video services as well as audio services via the cellular network.

Figure 3:
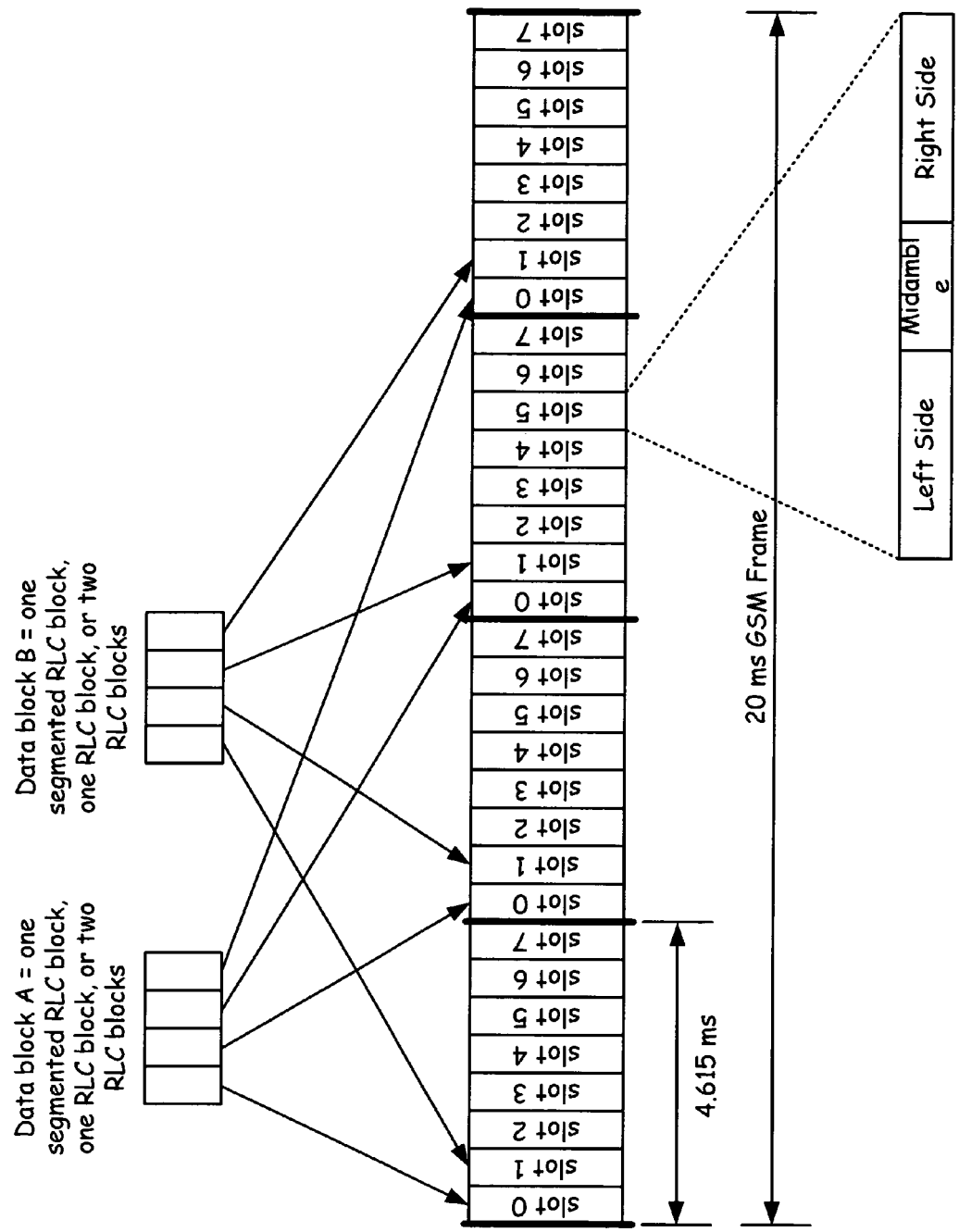
FIG. 3 is a block diagram illustrating the general structure of a GSM frame and the manner in which data blocks are carried by the GSM frame.

FIG. 3 is a block diagram illustrating the general structure of a GSM frame and the manner in which data blocks are carried by the GSM frame. The GSM frame, 20 ms in duration, is divided into quarter frames, each of which includes eight time slots, time slots 0 through 7. Each time slot is approximately 625 us in duration, includes a left side, a right side, and a midamble. The left side and right side of an RF burst of the time slot carry data while the midamble is a training sequence.

RF bursts of four time slots of the GSM frame carry a segmented RLC block, a complete RLC block, or two RLC blocks, depending upon a supported Modulation and Coding Scheme (MCS) mode. For example, data block A is carried in slot 0 of quarter frame 1, slot 0 of quarter frame 2, slot 0 of quarter frame 3, and slot 0 of quarter frame 3. Data block A may carry a segmented RLC block, an RLC block, or two RLC blocks. Likewise, data block B is carried in slot 1 of quarter frame 1, slot 1 of quarter frame 2, slot 1 of quarter frame 3, and slot 1 of quarter frame 3. The MCS mode of each set of slots, i.e., slot n of each quarter frame, for the GSM frame is consistent for the GSM frame but may vary from GSM frame to GSM frame. Further, the MCS mode of differing sets of slots of the GSM frame, e.g., slot 0 of each quarter frame vs. any of slots 1-7 of each quarter frame, may differ. The RLC block may carry voice data or other data.

Figure 4:
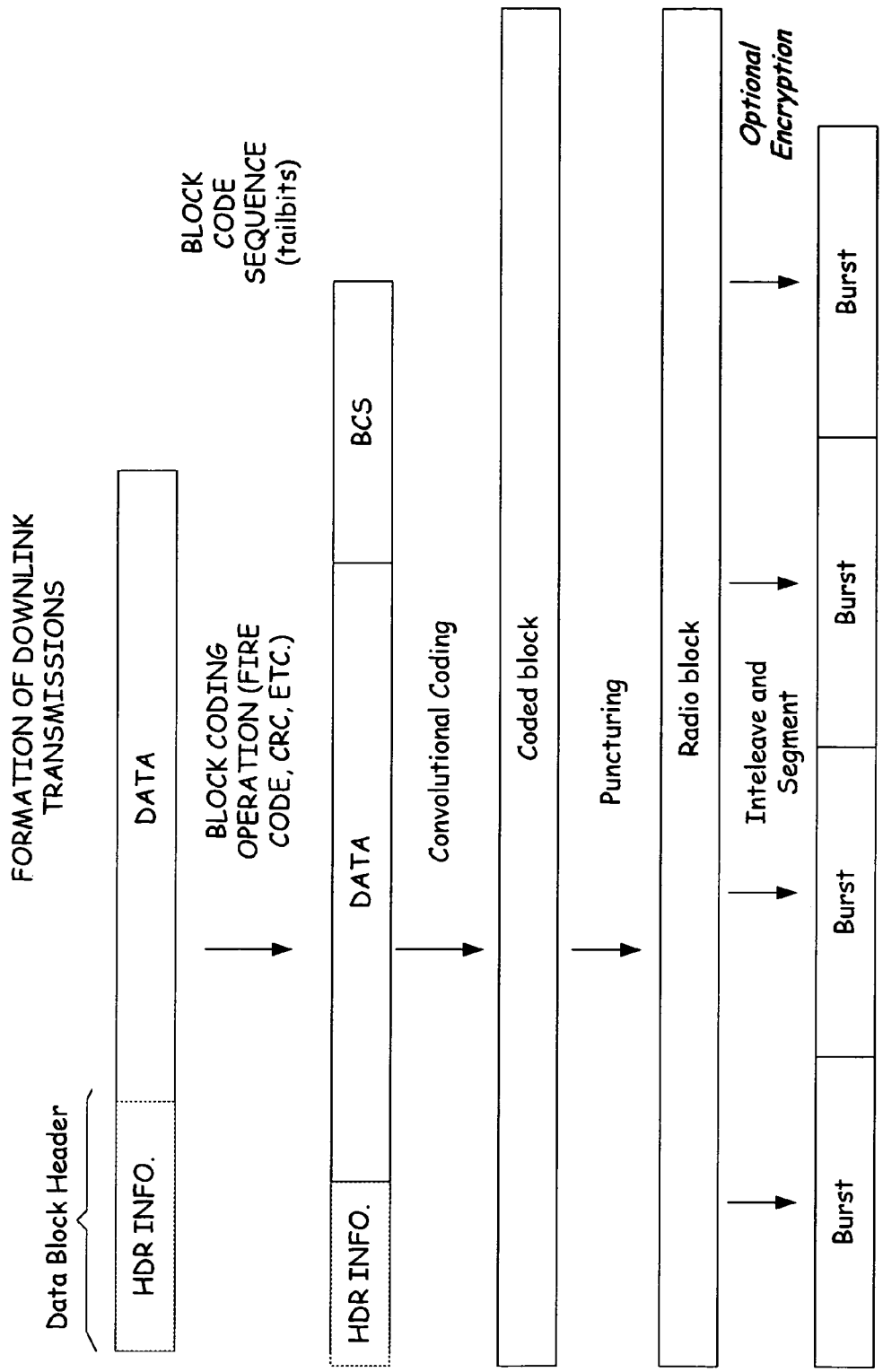
FIG. 4 is a block diagram illustrating the formation of down link transmissions.

FIG. 4 generally depicts the various stages associated with mapping data into RF bursts. Data is initially uncoded and maybe accompanied by a data block header. Block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the data. In CS-1, the header and data are coded together using block coding and convolutional coding. In non-CS-1 coding schemes, the header and data information are often coded separately.

Fire codes allow for either error correction or error detection. Fire Codes are a shortened binary cyclic code that appends redundancy bits to bits of the data Header and Data. The pure error detection capability of Fire Coding may be sufficient to let undetected errors go through with only a probability of $2^{-40}$. After block coding has supplemented the Data with redundancy bits for error detection, calculation of additional redundancy for error correction to correct the transmissions caused by the radio channels. The internal error correction or coding scheme is based on convolutional codes.

Some redundant bits generated by the convolutional encoder may be punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Figure 5:
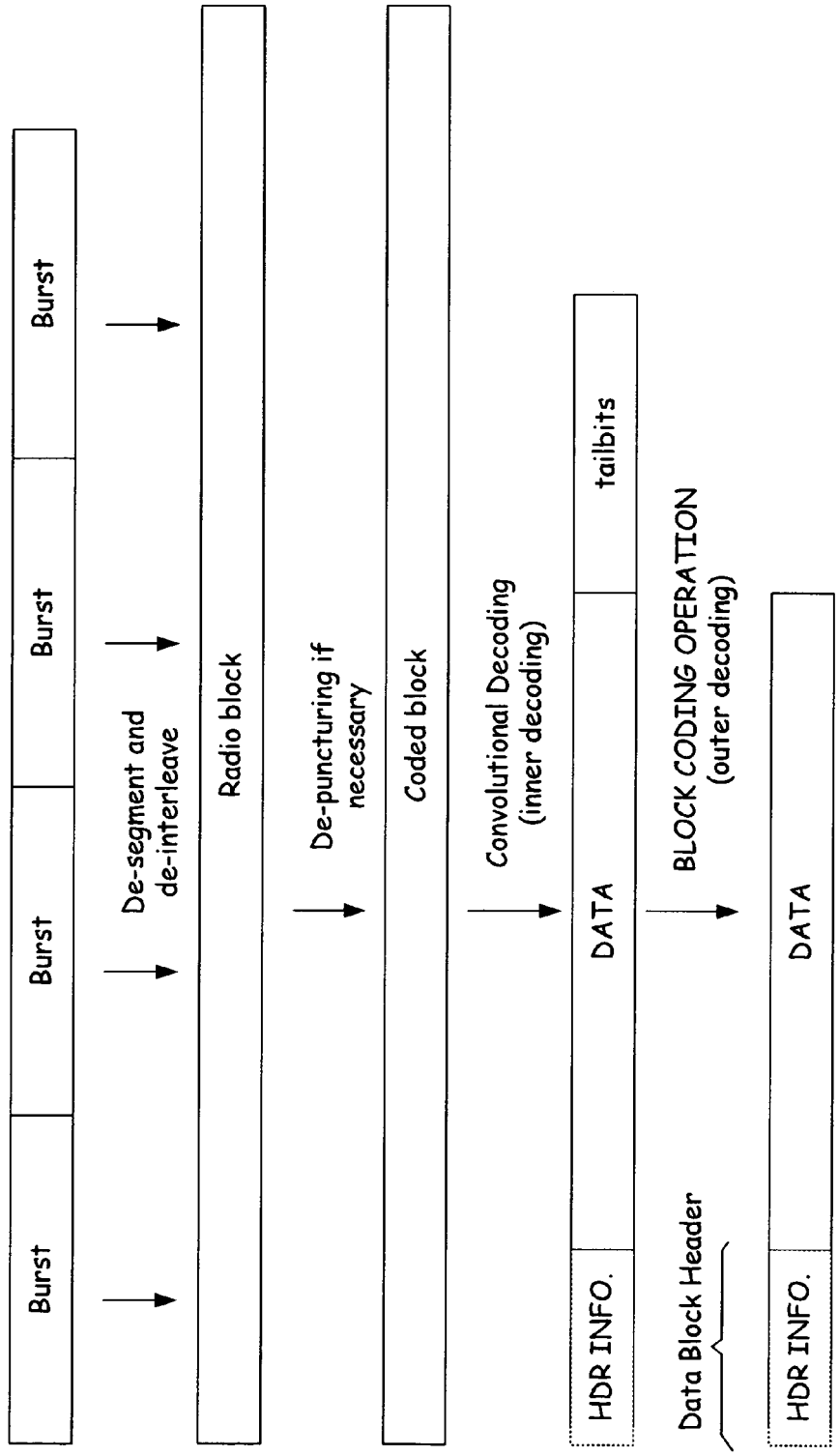
FIG. 5 is a block diagram illustrating the stages associated with recovering a data block from a series of RF bursts.
Figure 6:
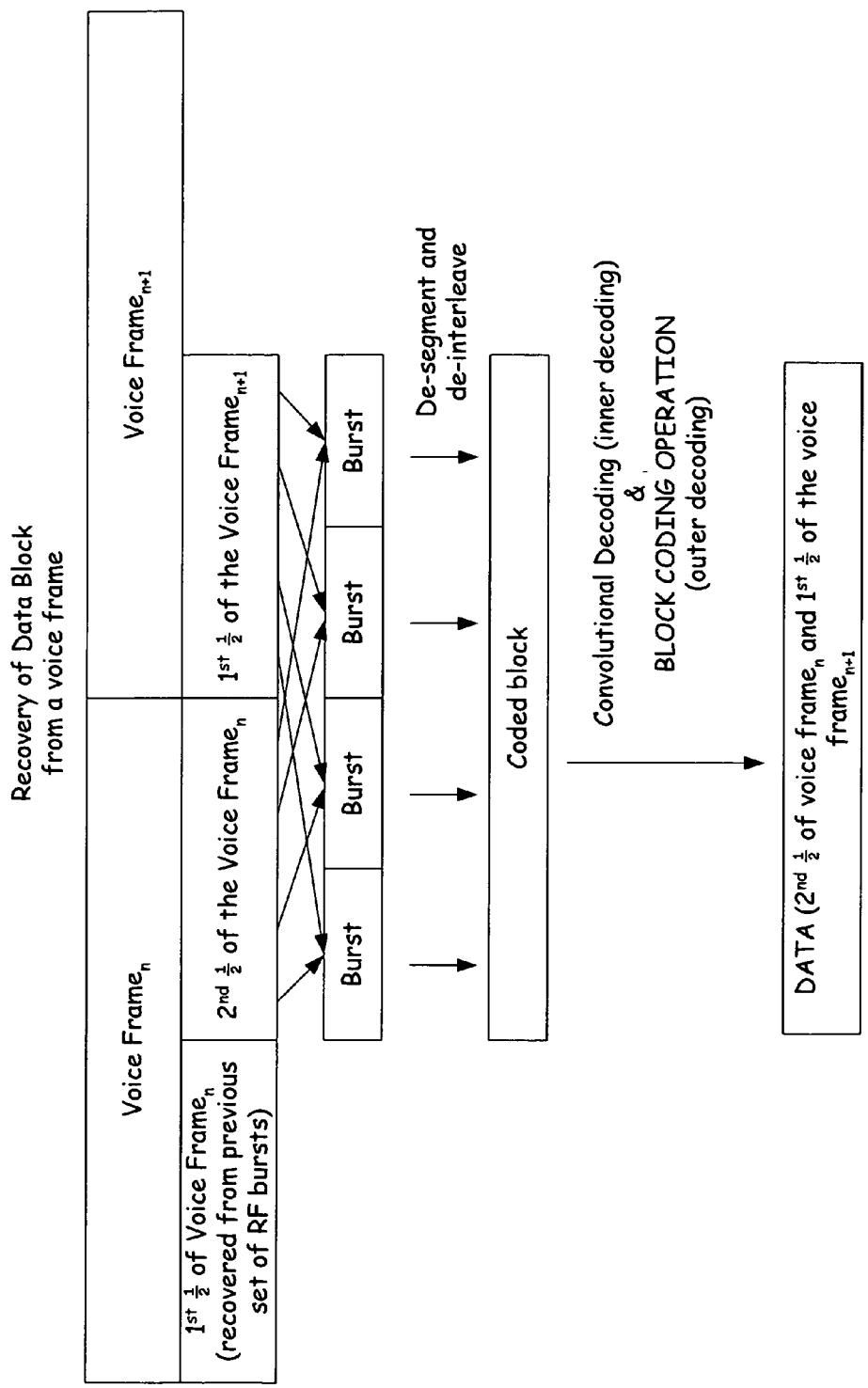
FIG. 6 is a block diagram illustrating the stages associated with recovering a voice data from a series of RF bursts.

FIG. 5 is a block diagram that generally depicts the various stages associated with recovering a data block from a RF burst(s). Four RF bursts typically make up a data block. These bursts are received and processed. Once all four RF bursts have been received, the RF bursts are combined to form an encoded data block. The encoded data block is then depunctured (if required), decoded according to an inner decoding scheme, and then decoded according to an outer decoding scheme. The decoded data block includes the data block header and the data. Depending on how the data and header are coded, partial decoding may be possible to identify data FIG. 6 is a block diagram that depicts the various stages associated with recovering data from a transmitted voice frame. This is similar to the process described with reference to FIG. 5. Typically a 20 millisecond voice frame is transmitted, wherein the first half of the 20 millisecond voice frame is transmitted within a first series of RF bursts and the second half of the voice frame is transmitted with a second series of RF bursts. A series of four RF bursts is shown as being off-set by 10 milliseconds from the first voice frame, Voice Frame$_n$, wherein the second half of Voice Frame$_n$ and the first half of the subsequent voice frame, Voice Frame$_{n+1}$, are coded and interleaved into the series of four RF bursts. When the four RF bursts are processed, the coded block produced produces a data stream that comprises the second half of Voice Frame$_n$ and the first half of Voice Frame$_{n+1}$. The first half of Voice Frame$_n$, stored within memory, may be combined with the second half of Voice Frame$_n$ to produce the data associated with a valid Voice Frame$_n$.

Figure 7:
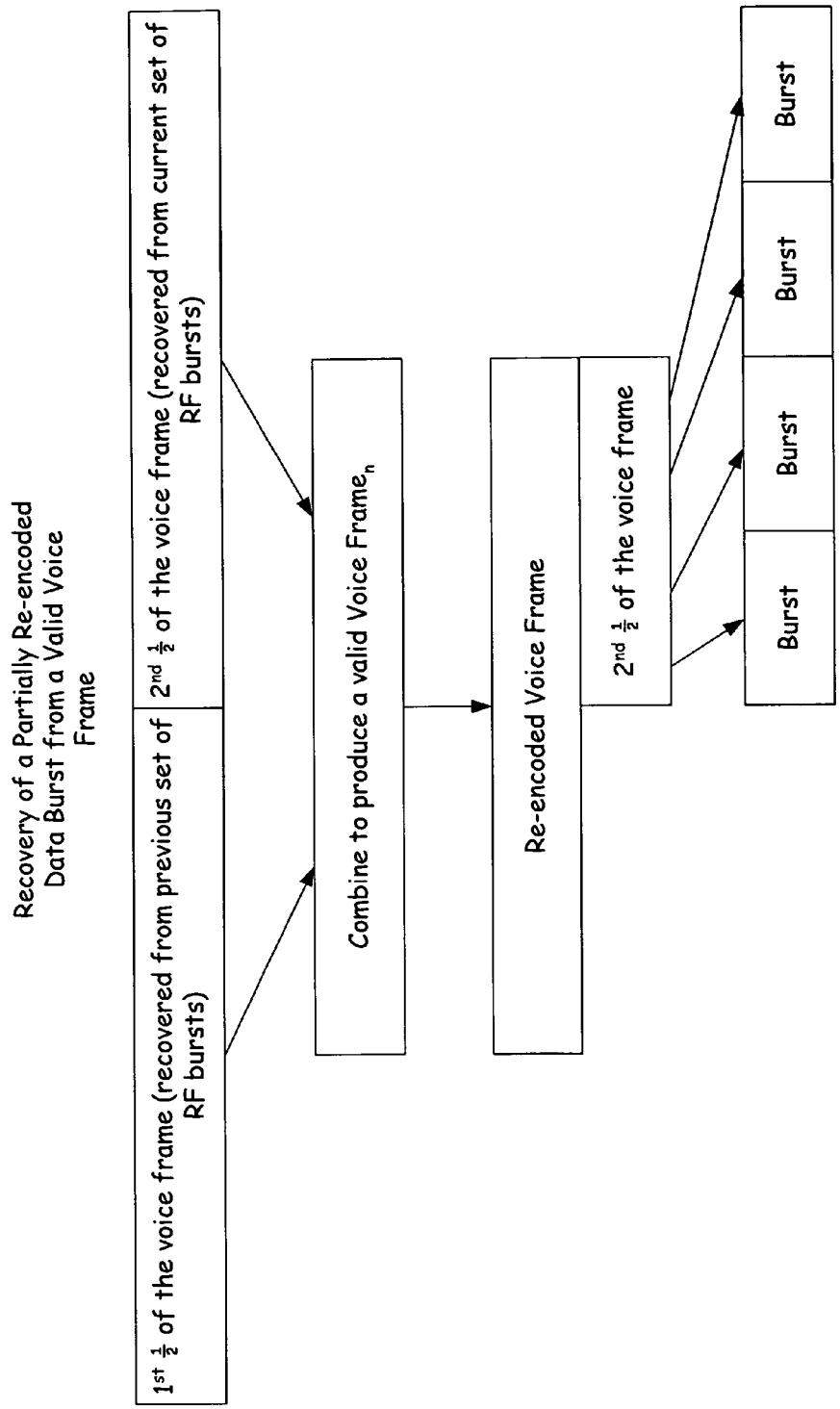
FIG. 7 is a block diagram illustrating the stages associated with recovering a burst from a data or voice frame.

Re-encoding the data associated with a valid Voice Frame$_n$, as described with reference to FIG. 7, may result in an at least partially re-encoded data bursts that may be used to train the second equalizer processing branch. As previously stated, the first half of the voice frame recovered from a previous set of RF bursts and the second half of the voice frame recovered from the current set of RF bursts are combined to produce the data associated with a voice frame. This voice frame may be validated and corrected using cycle redundancy checks in order to produce a valid voice frame. This valid voice frame may then be re-encoded. However, only the second half of the re-encoded Voice Frame$_n$ is used to partially recreate-the burst(s). The second half of re-encoded Voice Frame$_n$ may be segmented and interleaved to produce a series of partially encoded RF bursts. Since the processing of the second half of the Voice Frame$_{n+1}$ has not occurred, the RF bursts are only partially re-encoded. Since Voice Frame$_{n+1}$ has not been validated, the first half of a re-encoded Voice Frame$_{n+1}$ is not possible and is not used to recreate the burst(s). The partially re-encoded burst(s), based on Voice Frame$_n$, taken together with the known training sequences are operable to better train the second equalizer-processing branch in accordance with an embodiment of the present invention.

Figure 8A:
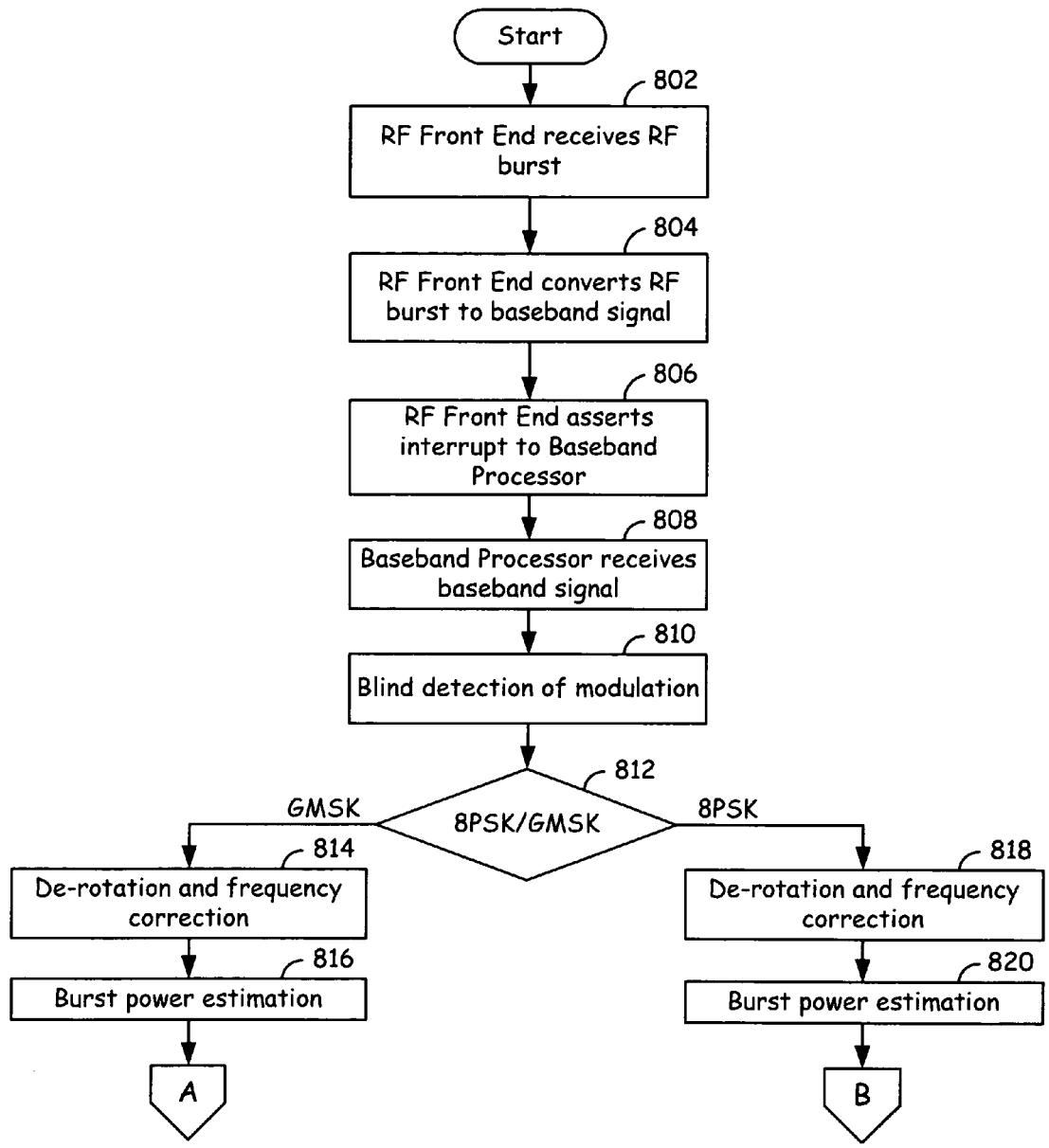
FIGS. 8A and 8B are flow charts illustrating operation of a wireless terminal in receiving and processing a RF burst.
Figure 8B:
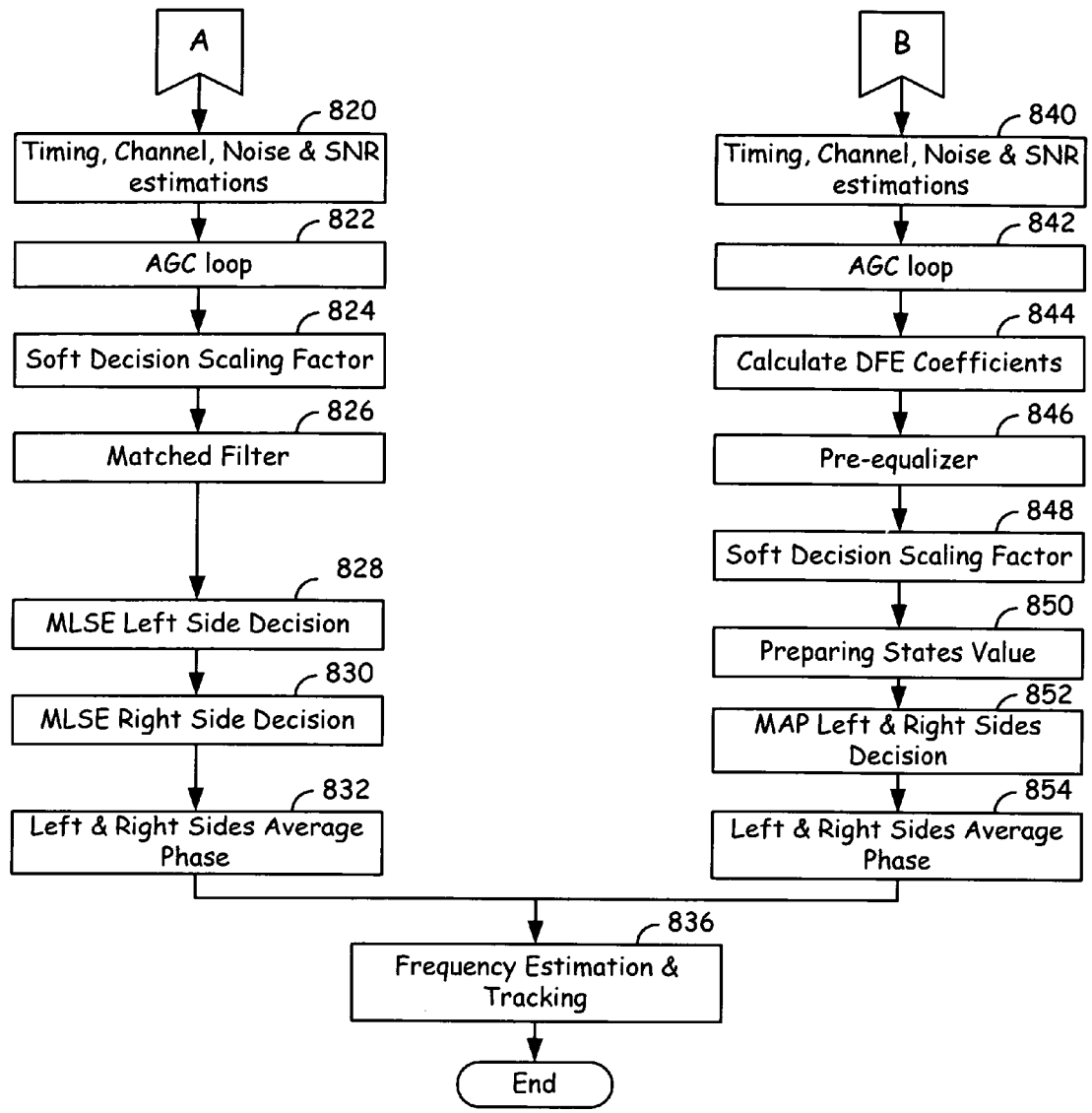

FIGS. 8A and 8B are flow charts illustrating operation of a wireless terminal 200 in receiving and processing a RF burst. The operations illustrated in FIGS. 8A and 8B correspond to a single RF burst in a corresponding slot of GSM frame. The RF front end, the baseband processor, and the equalizer processing module perform these operations. These operations are generally called out as being performed by one of these components. However, the split of processing duties among these various components may differ without departing from the scope of the present invention.

Referring particular to FIG. 8A, operation commences with the RF front end receiving an RF burst in a corresponding slot of a GSM frame (step 802). The RF front end then converts the RF burst to a baseband signal (step 804). Upon completion of the conversion, the RF front end sends an interrupt to the baseband processor (step 806). Thus, as referred to in FIG. 8A, the RF front end performs steps 802-806.

Operation continues with the baseband processor receiving the baseband signal (step 808). In a typical operation, the RF front end, the baseband processor, or modulator/demodulator will sample the analog baseband signal to digitize the baseband signal. After receipt of the baseband signal (in a digitized format), the baseband processor performs blind detection of a modulation format of the baseband signal of step 810. This blind detection of the modulation format determines the modulation format of the corresponding baseband signal. In one particular embodiment according to the GSM standard, the modulation format will be either Gaussian Minimum Shift Keying (GMSK) modulation or Eight Phase Shift Keying (8PSK) modulation. The baseband processor makes the determination (step 812) and proceeds along one of two branches based upon the detected modulation format.

Figure 11:
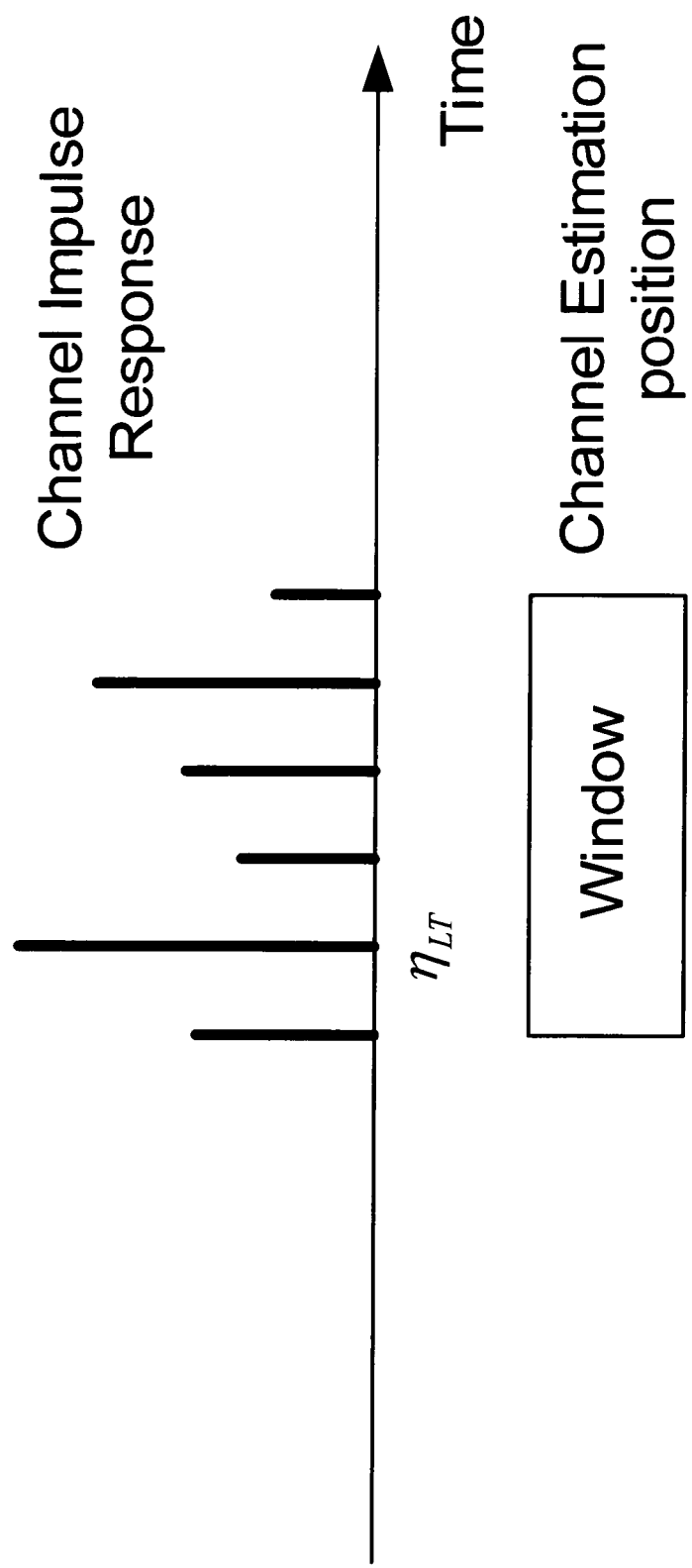
FIG. 11 is diagram that illustrates the channel estimation window positions for a channel having large dispersion.

For GMSK modulation, the baseband processor performs de-rotation and frequency correction of the baseband signal at step 814. Next, the baseband processor performs burst power estimation of the baseband signal at step 816. Referring now to FIG. 11 via off page connector A, the baseband processor next performs timing, channel, noise, and signal-to-noise ratio (SNR) estimation at step 820. Subsequently, the baseband processor performs automatic gain control (AGC) loop calculations (step 822). Next, the baseband processor performs soft decision scaling factor determination on the baseband signal (step 824). After step 824, the baseband processor performs matched filtering operations on the baseband signal at step 826.

Steps 808-826 are referred to hereinafter as pre-equalization processing operations. With the baseband processor performing these pre-equalization processing operations on the baseband signal it produces a processed baseband signal. Upon completion of these pre-equalization processing operations, the baseband processor issues a command to the equalizer module.

The equalizer module, whose operation as a multi-branch equalizer will be discussed in further detail with reference to FIG. 9 and following, upon receiving the command, prepares to equalize the processed baseband signal based upon the modulation format, e.g., GMSK modulation or 8PSK modulation. The equalizer module receives the processed baseband signal, settings, and/or parameters from the baseband processor and performs Maximum Likelihood Sequence Estimation (MLSE) equalization on the left side of the baseband signal at step 828. As was shown previously with reference to FIG. 3, each RF burst contains a left side of data, a midamble, and a right side of data. Typically, at step 828, the equalizer module equalizes the left side of the RF burst to produce soft decisions for the left side. Then, the equalizer module equalizes the right side of the processed baseband signal at step 830. The equalization of the right side produces a plurality of soft decisions corresponding to the right side. The burst equalization is typically based of known training sequences within the bursts. However, the embodiments of the present invention may utilize re-encoded or partially re-encoded data to improve the equalization process. This may take the form of an iterative process wherein a first branch performs burst equalization and a second module performs a second equalization based on the result obtained with the first branch over a series of RF bursts.

The equalizer module then issues an interrupt to the baseband processor indicating that the equalizer operations are complete for the RF burst. The baseband processor then receives the soft decisions from the equalizer module. Next, the baseband processor determines an average phase of the left and right sides based upon the soft decisions received from the equalizer module at step 832. The baseband processor then performs frequency estimation and tracking based upon the soft decisions received from the equalizer module at step 836. The operations of step 832, or step 854 and step 836 are referred to herein as "post-equalization processing." After operation at step 836, processing of the particular RF burst is completed.

Referring again to FIG. 8A, the baseband processor and equalizer module take the right branch from step 812 when an 8PSK modulation is blindly detected at step 810. In the first operation for 8PSK modulation, the baseband processor performs de-rotation and frequency correction on the baseband signal at step 818. The baseband processor then performs burst power estimation of the baseband signal at step 820. Referring now to FIG. 8B via off page connector B, operation continues with the baseband processor performing timing, channel, noise, and SNR estimations at step 840. The baseband processor then performs AGC loop calculations on the baseband signal at step 842. Next, the baseband processor calculates Decision Feedback Equalizer (DFE) coefficients that will be used by the equalizer module at step 844. The process to produce these coefficients will be described in further detail. This determination when using a multi-branch equalizer will be discussed with reference to FIG. 9 and following. The baseband processor then performs pre-equalizer operations on the baseband signal at step 846. Finally, the baseband processor determines soft decision scaling factors for the baseband signal at step 848. Steps 818-848 performed by the baseband processor 30 are referred to herein as "pre-equalization processing" operations for an 8PSK modulation baseband signal. Upon completion of step 648, the baseband processor issues a command to equalizer module to equalize the processed baseband signal.

Upon receipt of the command from the baseband processor, the equalizer module receives the processed baseband signal, settings, and/or parameters from the baseband processor and commences equalization of the processed baseband signal. The equalizer module first prepares state values that it will use in equalizing the 8PSK modulated processed baseband signal at step 850. In the illustrated embodiment, the equalizer module uses a Maximum A posteriori Probability (MAP) equalizer. The equalizer module then equalizes the left and right sides of the processed baseband signal using the MAP equalizer to produce soft decisions for the processed baseband signal at step 852. Upon completion of step 854, the equalizer module issues an interrupt to the baseband processor indicating its completion of the equalizing the processed baseband signal corresponding.

The baseband processor then receives the soft decisions from the equalizer module. Next, the baseband processor determines the average phase of the left and right sides of the processed baseband signal based upon the soft decisions (step 854). Finally, the baseband processor performs frequency estimation and tracking for the soft decisions (step 836). The operations of steps 854 and 836 are referred to as post-equalization processing operations. From step 836, operation is complete for the particular RF burst depicts the various stages associated with recovering a data block from an RF Burst.

While the operations of FIGS. 8A and 8B are indicated to be performed by particular components of the wireless terminal, such segmentation of operations could be performed by differing components. For example, the equalization operations could be performed by the baseband processor or system processor in other embodiments. Further, decoding operations could also be performed by the baseband processor or the system processor in other embodiments.

Figure 9:
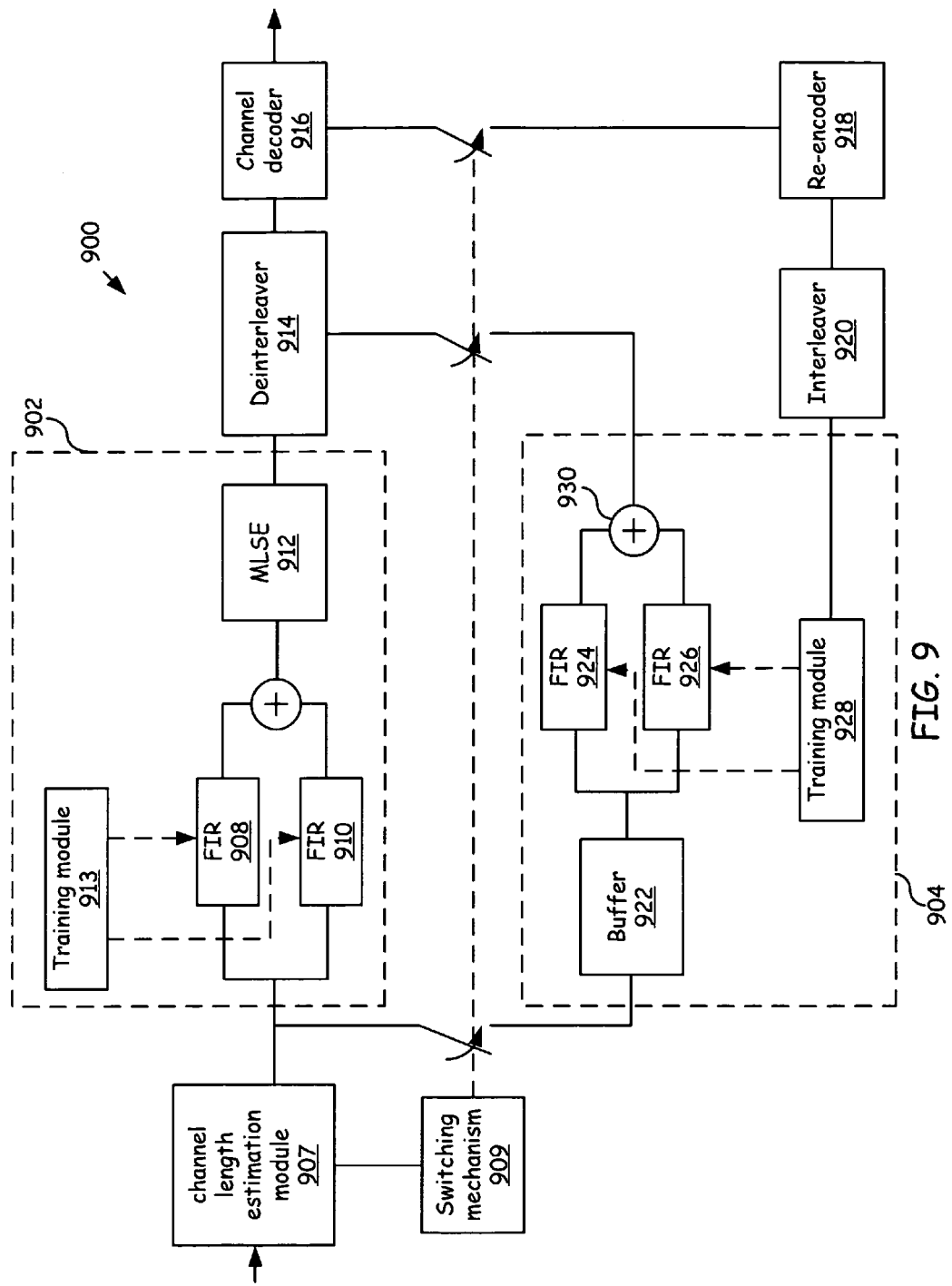
FIG. 9 is a block diagram illustrating components of a multi-branch burst equalization component according to an embodiment of the present invention.

FIG. 9 is a block diagram illustrating the structure of one embodiment of a multi-branch equalizer processing module 900 operable to perform single antenna interference cancellation (SAIC) in accordance with embodiments of the present invention. There are two types of SAIC equalizer methods: (1) joint-detection (JD); and (2) blind interference cancellation (BIC). According to one aspect of the present invention, BIC method is selected. The components illustrated in FIG. 9 may be hardware components, software components executed by a processor, e.g., 206 or 208 of FIG. 2, or a combination of hardware components and software components. Multi-branch equalizer processing module 900 includes a first equalizer processing branch 902 and second equalizer processing branch 904. A derotation block receives In phase (I) and Quadrature (Q) components of a baseband burst. This baseband burst corresponds to RF burst(s), which were described with reference to FIGS. 3-7. The derotation block derotates received I and Q burst samples and produces I and Q burst samples ("bursts"). These bursts may be examined by channel length estimation module 906 to determine the channel length or channel delay spread. The channel length or channel delay spread can affect GSM/GPRS/EDGE receiver performance and complexity. The longer is the channel length, the more channel taps need to be estimated within the first equalizer. That means less accuracy of channel estimation for longer length channel based on the same length of training sequence. The longest propagation model is the hilly terrain (HT) channel in GSM/EDGE spec. Additionally, the single antenna interference cancellation (SAIC) technique is difficult to apply to HT channel conditions. This difficulty is because the number of equalizer coefficients is large for the HT channel and the estimation accuracy of the coefficients is not good. Furthermore, the complexity of SAIC increases for HT channel in order to accommodate longer channel taps. Hence, there is a need to identify channels having long delay spreads, such as the HT channel, for multi-branch equalizer operable to perform SAIC. When such a channel is identified, the multi-branch equalizer may disable interference cancellation (SAIC) and only apply the conventional processing.

Even though conventional processing may only be used for channels having long delay spreads, such as the HT channel, conventional processing of GSM/GPRS/EDGE benefits from knowledge of the channel dispersion. For example, a MLSE receiver, within first equalizer processing branch 902, may be operable to adaptively choose the number of equalizer states for different channel dispersions instead of using a fixed largest number of states for all channel conditions. The adaptive selection may improve performance in channels having small channel dispersion.

One embodiment may accommodate the HT channel, with a window having 6 channel taps to estimate the channel. The correct channel estimation timing should be the position where the window contains the largest channel energy. The timing can be obtained through searching. Large variations in timing have been observed for channels having smaller dispersion, such as rural area (RA) and typical urban area (TU) propagation models. This will be described further with reference to FIGS. 10 and 11.

Figure 10:
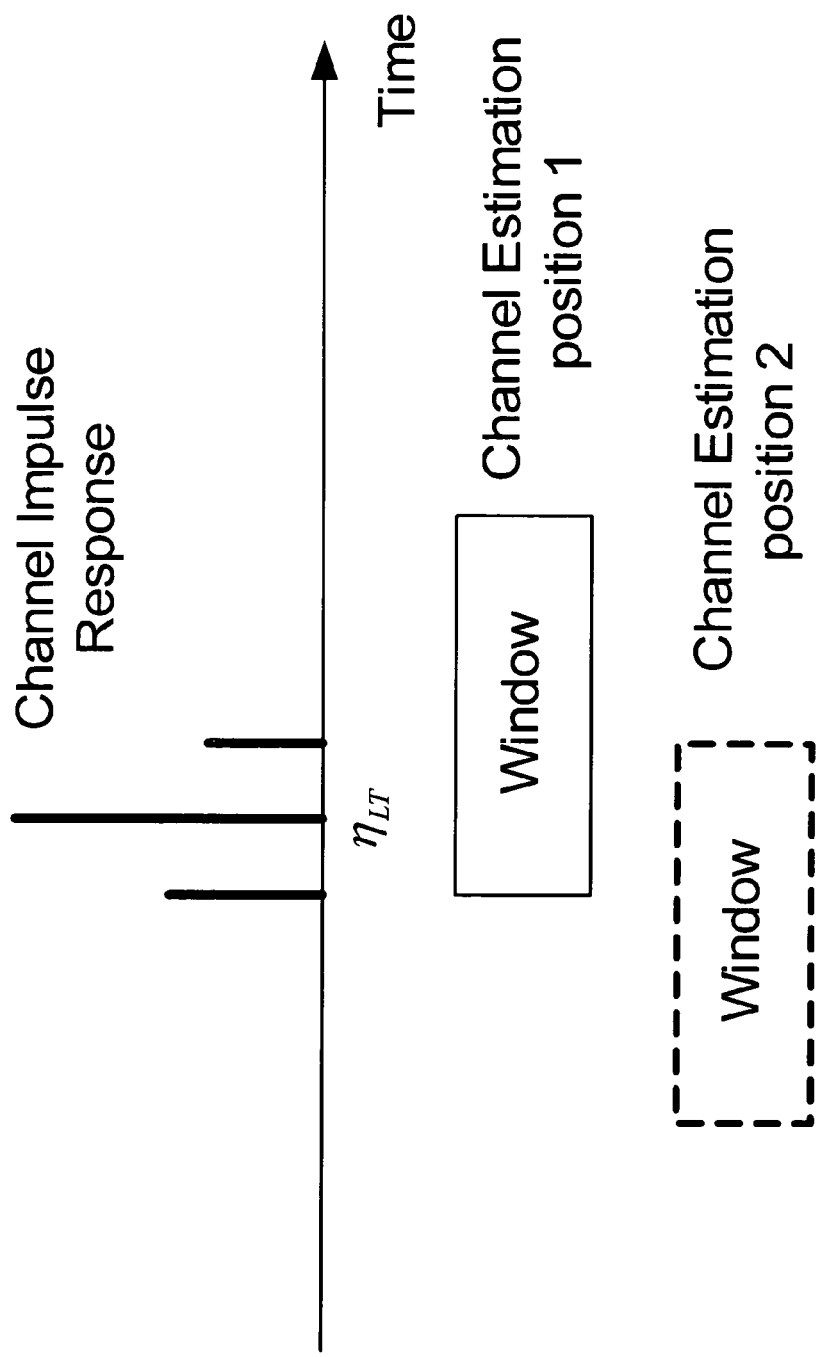
FIG. 10 is diagram that illustrates the channel estimation window positions for a channel having small dispersion.

FIG. 10 illustrates the channel estimation window positions for a channel having small dispersion, such as RA & TU channel models. The channel length of these channels is smaller than the window size. If one does not consider noise effects, the channel estimation has the multiple optimal window positions as long as the window includes the 3 main channel taps. FIG. 10 shows the two extreme optimal positions. However, the window position will change from burst to burst due to noise if one applies the maximum channel energy criteria to select the position.

FIG. 11 illustrates the channel estimation window positions for a channel having large dispersion, such as the HT channel. The channel length, being the same as the window size, allows only one optimal position to have all channel energy within the window. Hence, the channel estimation timing has less variation for HT channel.

Based on second order statistics associated with the channel estimation timing, one can determine the channel dispersion. The following discussion describes how to estimate timing and generate statistics.

The receiver performs timing estimation for channel estimation from burst to burst. This timing estimation has 3 steps. First the known training sequence is employed to perform a cross-correlation with the received burst around the midamble position as described below:

$$c(k) = \frac{1}{16}\sum_{j=0}^{15} y(63+k+j)a(j) \quad k = 0, \ldots, 12$$

where y(j) is the received the GSM/EDGE burst, a(j) is the known GSM/EDGE training sequence that has 16 symbols, and c(k) is the cross-correlation results. Next, the channel energy is calculated with channel length of 6 for different positions in c(k) sequence.

$$e(i) = \sum_{j=0}^{5} c^2(i+j) \quad i = 0, \ldots, 7$$

where e(i) is the channel energy. Then, the timing for channel estimation is the position that has the largest channel energy.

$$\eta_{CH} = \arg\max_i e(i)$$

where $\eta_{CH}$ is the estimated timing for channel estimation.

When the receiver is operating, the receiver may lock on to the base station with the long term tracked timing, $\eta_{LT}$. $\eta_{LT}$ can be obtained through the receiver time tracking loop. The squared error of $\eta_{CH}$ and $\eta_{LT}$ may be given by the expression:

$$\epsilon = (\eta_{CH} - \eta_{LT})^2$$

The squared error obtained from the nth burst further goes through the exponential average and results in:

$$\epsilon_{ave} = \epsilon_{ave} \cdot (1-\alpha) + \epsilon \cdot \alpha$$

where α is the exponential constant. The smaller the constant is, the longer the average is.

Figure 12:
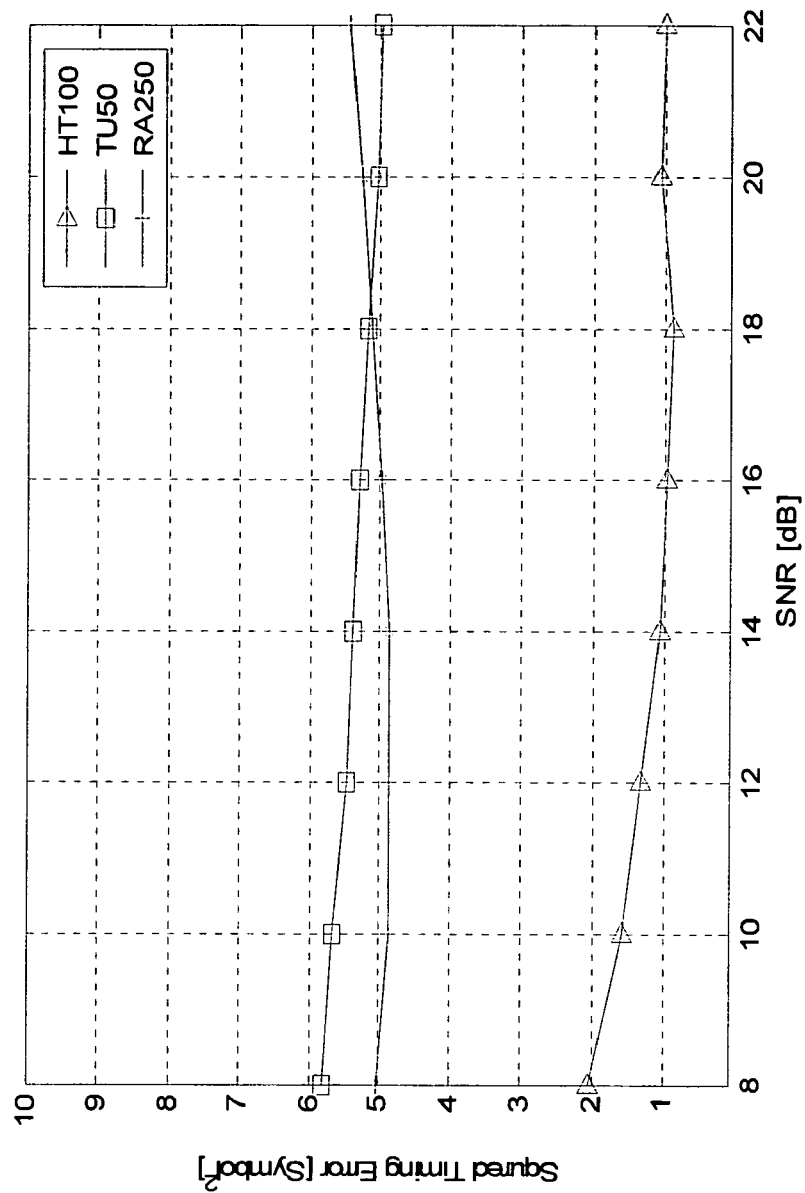
FIG. 12 is graph that shows the squared timing errors in different propagation models.

FIG. 12 shows the squared timing errors in different propagation models with α=0.01. One can observe from FIG. 12 that the HT channel has much smaller squared error than the channels with the small dispersion such as the RA and TU channels. Thus, from FIG. 12, one can easily identify the HT channel, or other like channels that have a long delay spread, if one compares the squared error with a predetermined channel length threshold. For example, the predetermined channel length threshold may be established as $Thresh_{HT}=3$. If the calculated squared timing error is smaller than, $\epsilon_{ave} \leq Thresh_{HT}$ (compares unfavorable to the predetermined channel length threshold), then the channel has a large dispersion. Thus, interference cancellation processes (SAIC) should be disable in order to prevent degradation of receiver performance. Alternatively, the number of equalizer state for conventional MLSE receivers should be reduced to improve performance when $\epsilon_{ave} > Thresh_{HT}$ (compares favorable to the predetermined channel length threshold).

Returning to FIG. 9, switch mechanism 909 operates based on the decision to enable or disable interference cancellation processes. In other embodiments, these criteria may combine logically with other factors such as, but not limited to SNR, the presence of colored noise, and the determination whether the received burst(s) are noise limited or interference limited, in order to determine whether to enable or disable interference cancellation processes (i.e. the second equalizer processing branch.)

In one embodiment, first equalizer processing branch 902 may include a conventional burst equalizer. These samples may be later equalized in accordance with the embodiments of the present invention with other samples making up a data packet, e.g., RLC packet. The iterative processes of the second equalizer processing branch may be performed in addition to the burst level equalization during certain operating conditions.

Burst equalizers, include I and Q Finite Impulse Response (FIR) filters 908 and 910 and Minimum Least Squares Estimation (MLSE) equalizer 912 that operate upon each burst received from a derotation block. These components are trained by training module 913 using known Training Sequence(s) (TS), within the midamble received with each burst. Alternately, these components could be trained over multiple bursts. First equalizer processing branch 902 produces soft decisions wherein multiple soft decisions represent each data bit prior to decoding. Each soft sample is provided to deinterleaver 914 which in turn provides the deinterleaved soft samples to channel decoder 916. Channel decoder 916 decodes a data frame from the soft samples (i.e. the multiple soft sample(s) that represent each data bit are decoded by the channel decoder to produce hard bits after decoding).

The data frame produced by channel decoder 916 may be validated and re-encoded using re-encoder 918 in order to produce re-encoded data bits. Interleaver 920 receives the re-encoded data bits to produce a re-encoded data burst(s). The re-encoded data burst(s), along with known training sequence(s), may then be used to train second equalizer processing branch 310.

Second equalizer processing branch 904 includes a buffer 922 operable to store multiple bursts in memory as well as an I and Q FIR filters 924 and 926, respectively. I and Q filters 924 and 926 are operable to be trained by training module 928 using known training sequence and at least partially re-encoded bursts. In this way, the second equalizer processing branch takes at least partially re-encoded data and known training sequences to train the I and Q RF filters. These results in an improved SNR for the burst(s) processed from buffer 922 when switch mechanism 909 enables the second equalizer processing branch based on the output of channel length estimation module 907. After the I and Q filters have been trained and used to process the stored burst(s). The results are combined with adder 930. This creates an alternate set of soft samples which are provided to deinterleaver 914 and channel Decoder 916 to produce an alternate set of data bits.

Figure 13:
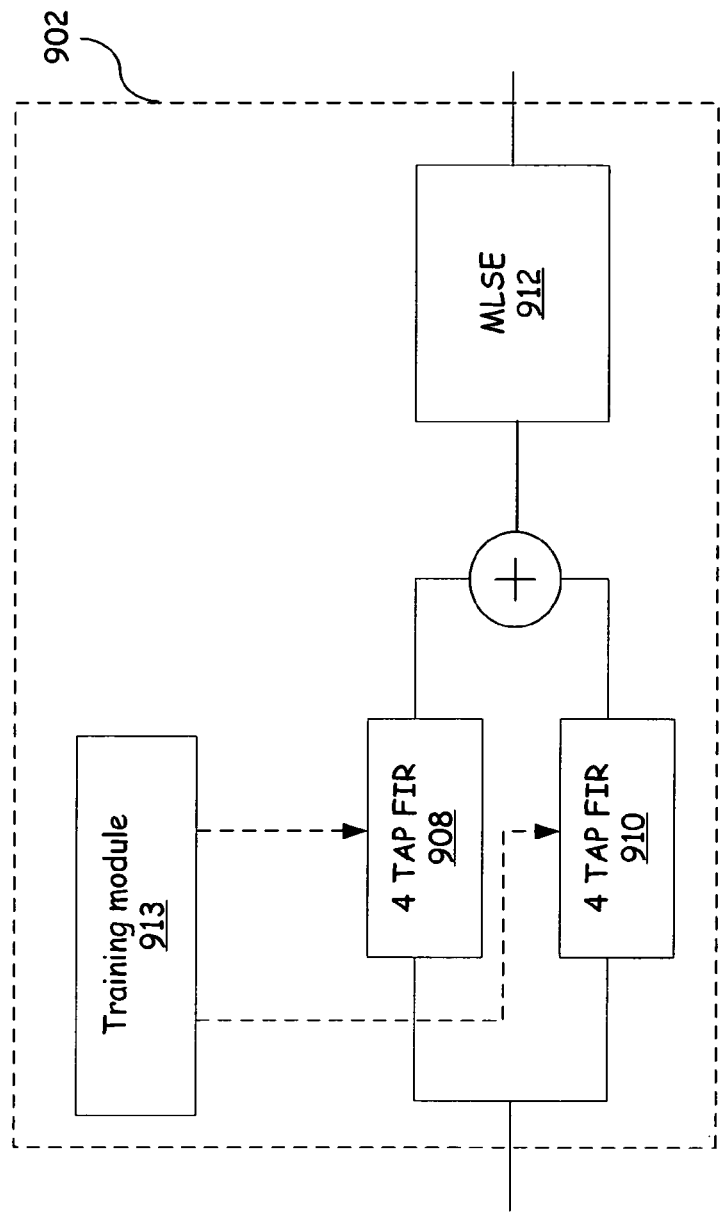
FIG. 13 is a block diagram illustrating components of a burst equalization component according to an embodiment of the present invention.

FIG. 13 may be used to describe the first branch of the multi-branch equalizer of FIG. 9 in more detail. In the case of ideal training, both 2-branch linear equalizer (LE) and decision-feedback equalizer (DFE) achieve satisfactory performance improvement compared with the conventional receiver. Since there are only 26 training symbols, the first processing branch as shown may train feed-forward filters 908 and 910 with an adjustable number of taps feedback filter DFEs.

Figure 14:
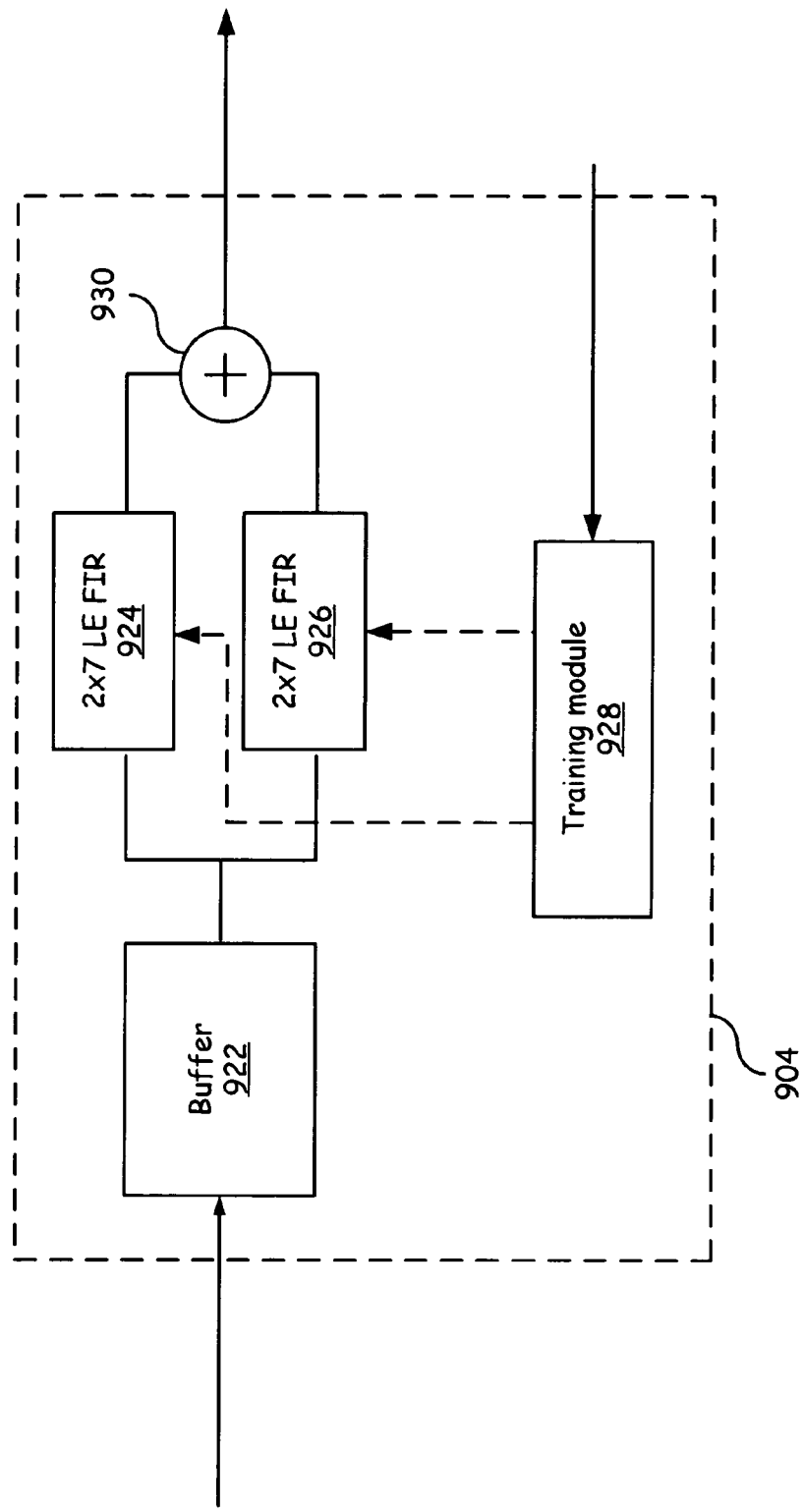
FIG. 14 is a block diagram illustrating components of a burst equalization component according to an embodiment of the present invention.
Figure 15:
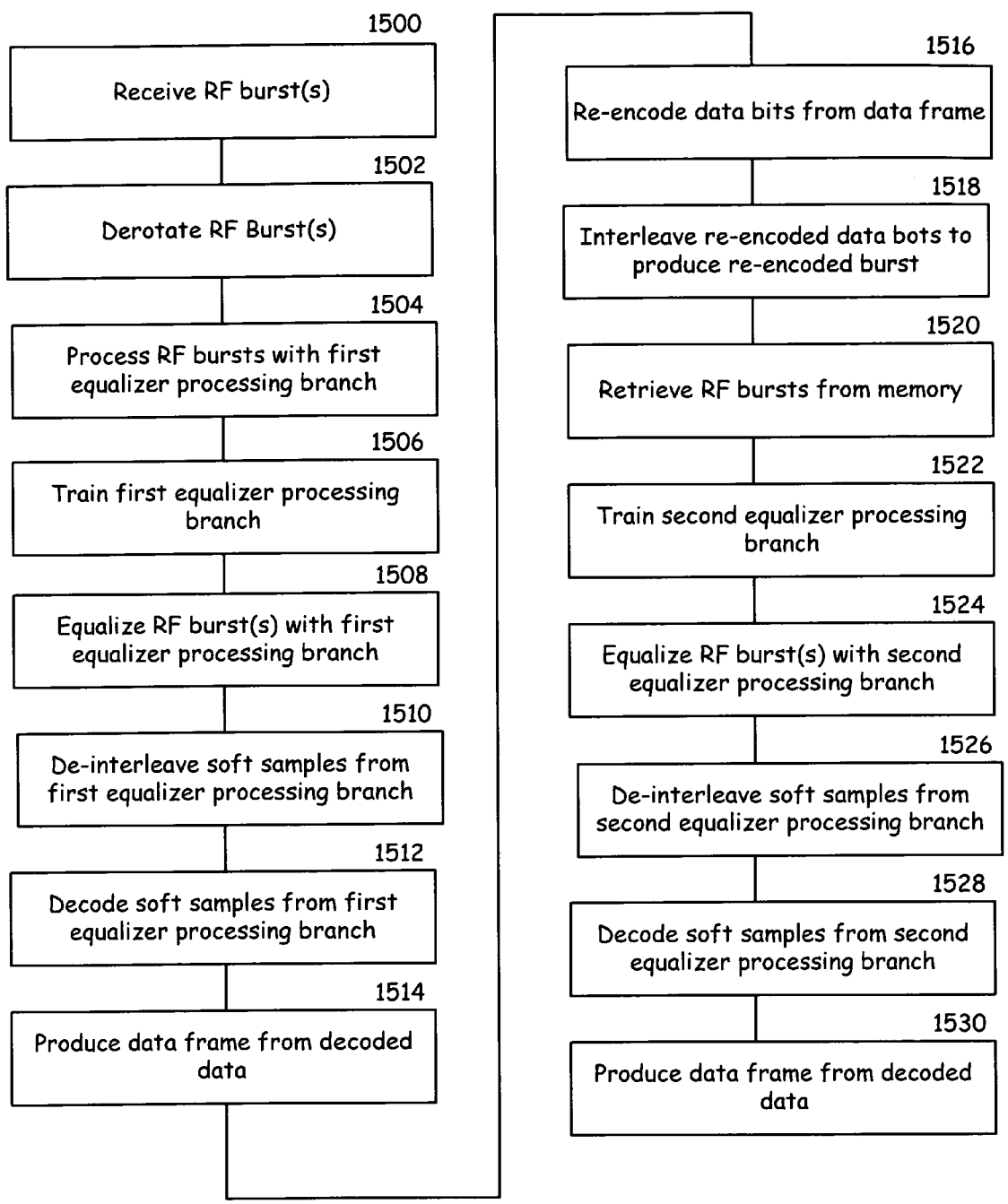
FIG. 15 is a flow chart illustrating operation according to an embodiment of the present invention.

FIG. 14 may be used to describe the second branch of the multi-branch equalizer of FIG. 9 in more detail. After channel decoding, the data is re-encoded and used to train 7 tap LEs 924 and 926. The reason to choose LE for the second branch is because of the inter-frame interleaving. The re-encoded bits that relate to a voice frame may only provide half of the burst (even data bits). DFEs need consecutive samples for the feedback filter. In addition, LE is simpler than DFE (MLSE). Other embodiments that use fully re-encoded bits may chose DFEs over Les for the second branch. Although buffer 922 is shown here as being located downstream of switching mechanism 909. The buffer may be placed upstream of the switching mechanism. This ensures that the received RF bursts are stored in memory no matter the state of the channel length estimation module 907 or switch controller 907A. Thus the bursts are immediately available to the second branch of the multi-branch equalizer when the second branch of the multi-branch equalizer is enabled by the output of the channel length estimation module 907 or switch controller 907A FIG. 15 provides a logic flow diagram illustrating equalizing received RF burst(s) using interference cancellation. This involves a step 1500 receiving a number of burst(s), which are then de-rotated as previously described in step 1502. In step 1504, processing the RF burst(s) with a first equalizer, such as the first equalizer processing branch, of FIG. 9 which is trained using the known training sequence in step 1506. The received RF bursts may be supplied to both the first equalizer processing branch and second equalizer processing branch. Within the second equalizer processing branch, a buffer or other memory location stores the received RF burst(s), for further processing. The first equalizer processing branch equalizes the received RF burst in step 1508 using filters that have been trained based on a known training sequence. This equalized RF burst produces a series of samples or soft decisions which are de-interleaved in step 1510 and decoded in step 1512 to yield extracted data bits. A data frame may be decoded from the extracted data bits in step 1514, which in turn may be re-encoded to produce re-encoded data bits in step 1516. In the case of a voice frame, this requires that the data from the current set of RF burst(s) be combined with that of a previous set of RF bursts to produce a valid voice frame. The voice frame may then be re-encoded to produce re-encoded data bits. The re-encoded data bits may be interleaved in step 1518 to produce a re-encoded data burst. This re-encoded data burst may comprise partially re-encoded bits when applied to voice frames.

Step 1520 retrieves RF burst(s) from memory for processing using a second equalizer processing branch. This may involve the retrieval of one or more RF bursts, which are processed using the second equalizer branch. The re-encoded data burst is provided as a signal to train the second equalizer processing branch in step 1522. This allows the RF burst stored in memory to be equalized in step 1524 using the second equalizer processing branch, wherein the second equalizer processing branch is trained not only on the known training sequence, but also at least some partially re-encoded data bits produced from the original output of the channel decoder. This allows the second processing branch to provide an improved output over the first processing branch by utilizing not only the known training sequence but also re-encoded data bits in order to better equalize or train the second equalizer processing branch. The second equalizer processing branch produces an alternate set of soft decisions, which may be de-interleaved in step 1526 and decoded in step 1528 in order to produce an alternate date frame in step 1530.

The following discussion further describes the indirect training method that may be based on the least-square channel estimation (LS-CE) and is similar to that used in EDGE. First the channel is estimated using the training sequence. Then the pre-filter and MLSE parameters are calculated as if they are the feed-forward and feedback filters of a DFE. A problem of the indirect method is poor CE since SAIC is usually operated at low SIR. The CE error propagates in the calculation filter coefficients.

The signal model at the MLSE input in FIG. 13 can be viewed as an ISI channel plus noise. Suppose the DFE feedback filter impulse response is $\{b(0), b(1), \ldots, b(L_b-1)\}$. The objective of training is to obtain pre-filter coefficients $\{f_1(0), \ldots f_1(L_f-1), f_2(0), \ldots f_2(L_f-1)\}$, and the MLSE parameters b for the given training symbols and corresponding received signal.

Based on above mode, the noise at the MLSE input is given by $$n(k) = \sum_{i=0}^{L_f-1} f_1(i) x_1(k+d-i) + \sum_{i=0}^{L_f-1} f_2(i) x_2(k+d-i) - \sum_{i=0}^{L_b-1} b(i) s(k-i)$$

where $x_1$ and $x_2$ are de-rotation output I & Q, respectively, s is the training symbol, d is the system delay. In vector form:

$$\begin{bmatrix} n(k) \\ n(k+1) \\ \vdots \\ n(k+N) \end{bmatrix} = \begin{bmatrix} x_1(k+d) & \cdots & x_1(k+d-L_f+1) & x_2(k+d) & \cdots & x_2(k+d-L_f+1) \\ x_1(k+d+1) & \cdots & x_1(k+d+1-L_f+1) & x_2(k+d+1) & \cdots & x_2(k+d+1-L_f+1) \\ \vdots & & \vdots & & & \vdots \\ x_1(k+d+N) & \cdots & x_1(k+d+N-L_f+1) & x_2(k+d+N) & \cdots & x_2(k+d+N-L_f+1) \end{bmatrix}$$

$$\begin{bmatrix} f_1(0) \\ \vdots \\ f_1(L_f-1) \\ f_2(0) \\ \vdots \\ f_2(L_f-1) \end{bmatrix} - \begin{bmatrix} s(k) & \cdots & s(k-L_b+1) \\ s(k+1) & \cdots & s(k+1-L_b+1) \\ \vdots & & \vdots \\ s(k+N) & \cdots & s(k+N-L_b+1) \end{bmatrix} \begin{bmatrix} b(0) \\ \vdots \\ b(L_b-1) \end{bmatrix}$$

For convenience, boldface low-case letters are used for vectors, and boldface upper-case letter for matrix to represent the above equation:

$$n = Xf - Sb$$

The criterion of equalizer is to find f and b that minimizes the MLSE input noise, $$\min \|n\|^2$$

Since the number of training symbols is limited, joint optimization of f and b is sensitive to noise. The following discussion derives a sub-optimal approach that reduces the estimated parameter to pre-filer f only.

Cross-correlation between the pre-filter outputs (X f) and training symbol may be by the ISI channel at the MLSE input (b). Thus b can be represented by f. Using LS CE at the pre-filter output, and let b be the channel estimate provides:

$$b = S^+ X f$$

where $(\ )^+$ represents the pseudo-inverse. Substituting above will minimization the function, to yield:

$$\min \|Xf - SS^+ Xf\|^2 = \min \|(I - SS^+)Xf\|^2 = \min f'Af$$

where $A = X'(I - SS^+)X$, and $(\ )'$ is the transpose operation. To avoid trivial solution, constraints are applied. Two types commonly used constraints are Unit-norm constraint and the Linear constraint. When this constrains the norm of 1, then the optimization solution is the eigen-vector of A corresponding to the least eigenvalue Provides:

$$f = \text{eigvec}(A)$$

A linear constraint may also be chosen for f. For example, we can fix i-th element of b to 1. In another word, the i-th tap of MLSE channel b is 1. When c is the i-th row vector of $S^+ X$. Then the linear constraint is given by:

$$cf = 1$$

This results in an optimization solution given by:

$$f = A^{-1} c'$$

The linear constraint is often better than the unit-norm constraint. In the linear constraint, if the first tap is chosen to be one, the above minimization criterion is equivalent to the DFE criterion. Diagonal loading also helps at high SIR range.

In HT channel conditions, or other like channel conditions having a long delay spread, interface cancellation processing may result in performance worse than that of the conventional processing. Channels having long delays can also cause large degradation due to the short pre-filter length. To solve the problem, a switch function may be added to enable or disable the interference cancellation process. The switch may be based on any combination of SNR, Colored noise discriminator and Channel profile detector.

Figure 16A:
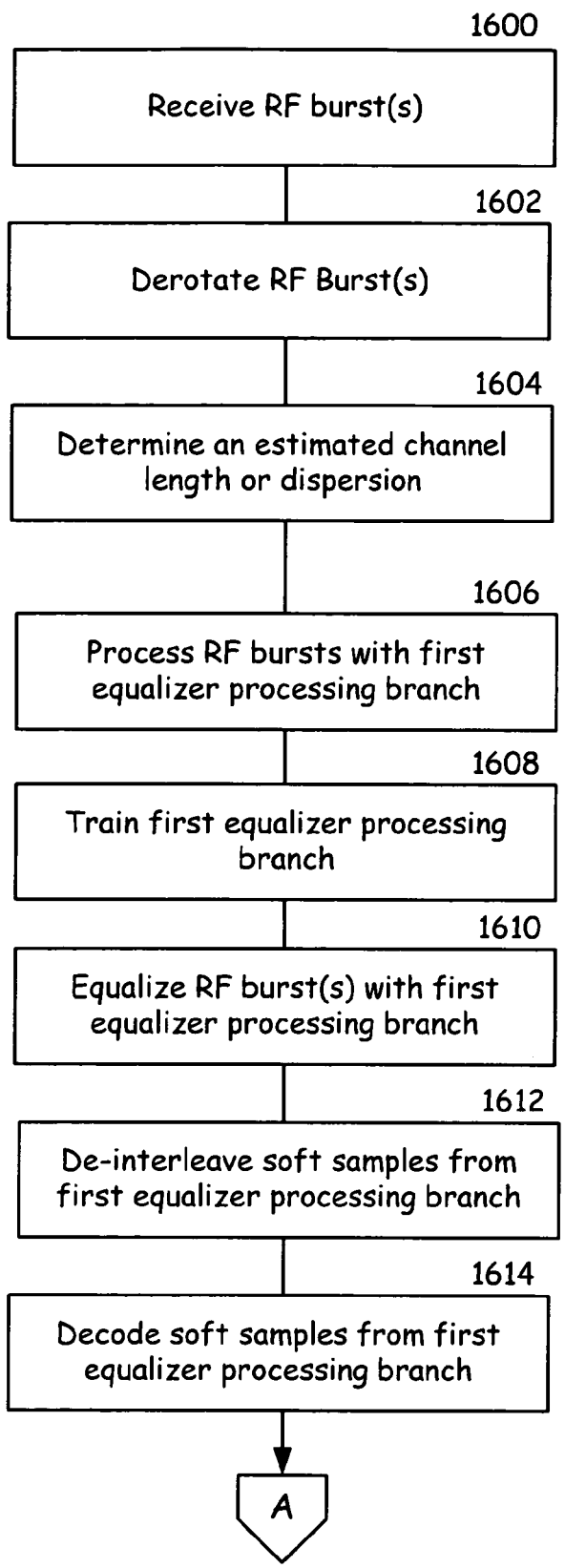
FIGS. 16A and 16B are flow charts illustrating operation according to an embodiment of the present invention.
Figure 16B:
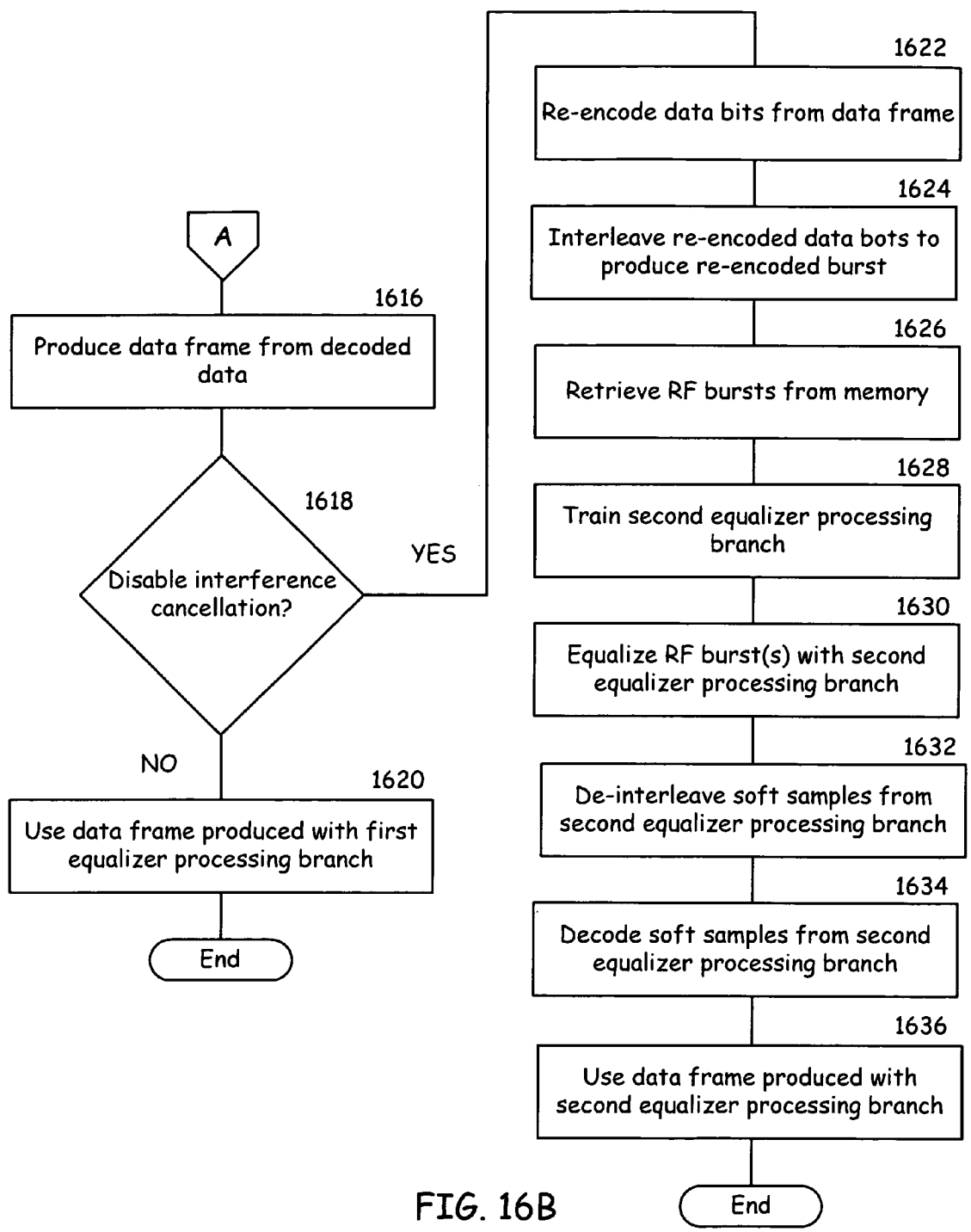

FIGS. 16A and 16B provides a logic flow diagram illustrating one embodiment of equalizing received RF burst(s) that employs a channel length estimation module to enable or disable an interference cancellation equalizing process. This involves at step 1600 receiving a number of burst(s), which are then de-rotated as previously described in step 1602. Step 1604 determines a measure of the estimated channel length or channel dispersion, such as the squared error as described with reference to FIG. 12. Step 1606 processes the RF burst(s) with a first equalizer, such as the first equalizer processing branch, of FIG. 9 which is trained using the known training sequence in step 1608. The received RF bursts may be supplied to both the first equalizer processing branch and second equalizer processing branch. Within the second equalizer processing branch, a buffer or other memory location stores the received RF burst(s), for further processing. The first equalizer processing branch equalizes, deinterleaves, and decodes the received RF burst in steps 1610, 1612, and 1614. A data frame may be decoded from the extracted data bits in step 1616. Decision point 1618 determine if the measure of the estimated channel length or channel dispersion compares favorably or not to a predetermined threshold. If the measure compares favorably, then the data frame produced only by the first equalizer processing branch should be sufficient. However, if the measure compares unfavorably at decision point 1618, the second equalizer processing branch should be used. Such may be the case when an 8PSK signal is interfering with a GMSK signal.

Step 1622 re-encodes the data bits produced by the operation of the first equalizer processing branch to produce re-encoded data bits. In the case of a voice frame, this requires that the data from the current set of RF burst(s) be combined with that of a previous set of RF bursts to produce a valid voice frame. The voice frame may them be re-encoded to produce re-encoded data bits. The re-encoded data bits may be interleaved in step 1624 to produce a re-encoded data burst. This re-encoded data burst may comprise partially re-encoded bits when applied to voice frames.

Step 1626 retrieves RF burst(s) from memory for processing using the second equalizer processing branch. This may involve the retrieval of one or more RF bursts, which are processed using the second equalizer branch. The re-encoded data burst is provided as a signal to train the second equalizer processing branch in step 1628. This allows the RF burst stored in memory to be equalized in step 1630 using the second equalizer processing branch, wherein the second equalizer processing branch is trained not only on the known training sequence, but also at least some partially re-encoded data bits produced from the original output of the channel decoder. This allows the second processing branch to provide an improved output over the first processing branch by utilizing not only the known training sequence but also re-encoded data bits in order to better equalize or train the second equalizer processing branch. The second equalizer processing branch produces an alternate set of soft decisions, which may be de-interleaved in step 1632 and decoded in step 1634 in order to produce an alternate date frame in step 1636.

In summary, the present invention provides a multi-branch equalizer processing module operable to cancel interference associated with received radio frequency (RF) burst(s). This multi-branch equalizer processing module includes both a first equalizer processing branch and a second equalizer processing branch. The first equalizer processing branch is operable to be trained based upon known training sequences and equalize the received RF burst. This results in soft samples or decisions which in turn may be converted to data bits. The soft samples are processed with a de-interleaver and channel decoder, where the combination is operable to produce a decoded frame of data bits from the soft samples. A re-encoder may re-encode the decoded frame to produce re-encoded or at least partially re-encoded data bits. An interleaver then processes the at least partially re-encoded data bits to produce and at least partially re-encoded burst. The second equalizer processing branch uses the at least partially re-encoded data bits to train linear equalizer(s) within the second equalizer processing branch. A buffer may initially store the received RF burst(s), which are retrieved and equalized by the second equalizer processing branch once the linear equalizer(s) are trained. This results in alternate soft samples or decisions which in turn may be converted to alternate data bits. The alternate soft samples are processed with the de-interleaver and channel decoder, where the combination is operable to produce an alternate decoded frame of data bits from the alternate soft samples. This allows interfering signals to be cancelled and more accurate processing of the received RF bursts to occur. This second branch may be selectively enabled or disabled based on measured channel conditions. Channel conditions having a long delay spread nay require the disabling of interface cancellation processing, as this processing may result in performance worse than that of the conventional processing.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

What is claimed is:

1. A multi-branch equalizer processing module operable to selectively enable interference cancellation for the processing of received radio frequency (RF) burst(s), comprising:

a channel length estimation module operable to:
  determine a channel length associated with a the RF burst(s); and
  selectively disable interference cancellation when the channel length compares unfavorably with a predetermined channel length threshold;
a first equalizer operable to be trained based upon a known training sequence, to equalize RF burst(s), and to extract data bits from the RF burst(s); and
a second equalizer operable to be trained based upon at least the known training sequence, to equalize the RF burst(s), and to extract alternate data bits from RF burst(s), when the channel length associated with the RF burst(s) compares favorably with the predetermined channel length threshold.

2. The multi-branch equalizer processing module of claim 1, wherein the second equalizer is operable to also be trained based upon re-encoded data bits extracted from the RF burst(s).

3. The multi-branch equalizer processing module of claim 1, wherein the channel length estimation module is operable to selectively disable interference cancellation when:
  a measure of the colored noise associated with the RF burst(s) compares unfavorably with a predetermined colored noise threshold; and
  a signal-to-noise ratio (SNR) associated with the RF burst(s) compares unfavorably with a predetermined SNR threshold.

4. The multi-branch equalizer processing module of claim 1, wherein the predetermined channel length threshold is based on a hilly terrain (HT) channel.

5. The multi-branch equalizer processing module of claim 1, wherein the channel length estimation module is further operable to:
  adjust a number of equalizer states for the first equalizer based on the channel length associated with the RF burst(s).

6. The multi-branch equalizer processing module of claim 1, further comprising:
  a deinterleaver operable to deinterleave the extracted data bits from the first equalizer;
  a channel decoder operable to decode a frame comprised of the extracted data bits;
  a re-encoder operable to re-encode the frame to produce re-encoded data bits;
  an interleaver operable to interleave the re-encoded data bits and the known training sequence to produce a re-encoded burst, wherein the second equalizer is operable to also be trained based upon the re-encoded burst(s);
  the deinterleaver operable to deinterleave the alternate data bits; and
  the channel decoder operable to decode an alternate frame comprised of at least some of the alternate data bits.

7. The multi-branch equalizer processing module of claim 1, wherein:
  the received RF bursts that the channel length estimation module examines to determine when to selectively enable interference cancellation comprises a first set of RF bursts; and
  the received RF bursts that the first equalizer and second equalizer process comprise a second set of RF bursts, wherein the first set of RF bursts preceded the second set of RF bursts; and
  the sets of RF bursts comprise:
    4 RF bursts; or
    2 RF burst for half rate adaptive multi-rate encoded speech.

8. A wireless terminal that comprises:
a Radio Frequency (RF) front end operable to receive RF burst(s);
a baseband processor communicatively coupled to the RF front end, wherein the baseband processor and RF front end are operable to produce a baseband signal from the RF burst(s); and
a channel length estimation module operable to:
  determine a channel length associated with a the RF burst(s); and
  selectively disable interference cancellation when the channel length compares unfavorably with a predetermined channel length threshold;
a multi-branch equalizer processing module operably coupled to the baseband processor and mode selection module, wherein the multi-branch equalizer processing module receives the baseband signal from the baseband processor, and wherein the multi-branch equalizer processing module further comprises:
  a first equalizer processing branch operable to:
    be trained based upon known training sequence(s);
    equalize the received RF burst(s); and
    extract data bits from the received RF burst(s);
  a second equalizer processing branch operable to:
    be trained based upon an at least partially re-encoded burst comprising the known training sequence(s) and re-encoded data bits, wherein the at least partially re-encoded burst are produced by processing a decoded frame;
    equalize the received RF burst(s); and
    extract alternate data bits from the received RF burst(s);
wherein the combination of the baseband processor and multi-branch equalizer processing module are operable to produce a data block from:
  soft decisions; or
  alternative soft decisions when the channel length associated with the RF burst(s) compares favorably with the predetermined channel length threshold;
a de-interleaver operable to deinterleave the data block;
a decoder operable to decode a data frame from the data block;
a re-encoder operable to re-encode the data frame to produce at least a partially re-encoded data block; and
an interleaver operable to interleave the at least partially re-encoded data block to produce the at least partially re-encoded burst.

9. The wireless terminal of claim 8, wherein the channel length estimation module is operable to selectively disable interference cancellation when:
  a measure of the colored noise associated with the RF burst(s) compares unfavorably with a predetermined colored noise threshold; and
  a signal-to-noise ratio (SNR) associated with the RF burst(s) compares unfavorably with a predetermined SNR threshold.

10. The wireless terminal of claim 8, wherein the predetermined channel length threshold is based on a hilly terrain (HT) channel.

11. The wireless terminal of claim 8, wherein the channel length estimation module is further operable to:
  adjust a number of equalizer states for the first equalizer based on the channel length associated with the RF burst(s).

12. The wireless terminal of claim 8, wherein:
the received RF bursts that the channel length estimation module examines to determine when to selectively enable interference cancellation comprises a first set of RF bursts; and
the received RF bursts that the first equalizer and second equalizer process comprise a second set of RF bursts, wherein the first set of RF bursts preceded the second set of RF bursts; and
the sets of RF bursts comprise:
4 RF bursts; or
2 RF burst for half rate adaptive multi-rate encoded speech.

13. The wireless terminal of claim 8, wherein the channel length estimation module is further operable to reduce a number of equalizer states for the first equalizer when selectively disabling interference cancellation based on the channel length associated with a the RF burst(s).

14. The wireless terminal of claim 8, wherein the RF burst(s) include Gaussian Minimum Shift Keying (GMSK) symbols carrying the data bits and interfering Eight Phase Shift Keying (8PSK)/GMSK symbols.

15. A method for equalizing received radio frequency (RF) burst(s), comprising:
examining the received RF bursts to determine a channel length associated with a RF burst(s);
establishing a predetermined channel length threshold for selectively disabling interference cancellation;
determining the channel length associated with the RF burst(s);
comparing the channel length associated with the RF burst(s) with the predetermined channel length threshold, wherein interference cancellation is disabled when the channel length associated with the RF burst(s) compares unfavorably with the predetermined channel length threshold;
training a first equalizer with a known training sequence;
equalizing the received RF bursts with the first equalizer;
deinterleaving the RF burst;
decoding the RF burst(s) to yield extracted data bits;
decoding a frame from the extracted data bits;
wherein interference cancellation comprises:
re-encoding the frame to produce re-encoded data bits;
interleaving the re-encoded data bits;
training a second equalizer with the known training sequence and the re-encoded data bits;
equalizing the received RF bursts to extract alternative data bits with the second equalizer;
deinterleaving the alternative extracted data bits; and
decoding an alternate frame from the deinterleaved alternative extracted data bits.

16. The method of claim 15, further comprising:
determining a measure of the colored noise associated with the RF burst(s); and
determining a signal-to-noise ratio (SNR) associated with the RF burst(s).

17. The method of claim 16, further comprising enabling interference cancellation when:
the measure of the colored noise associated with the RF burst(s) compares unfavorably with a predetermined colored noise threshold; and
the SNR associated with the RF burst(s) compares unfavorably with a predetermined SNR threshold.

18. The method of claim 16, further comprising adjusting a number of equalizer states for the first equalizer based on the channel length associated with a the RF burst(s).

19. The method of claim 16, further comprising reducing a number of equalizer states for the first equalizer when selectively disabling interference cancellation based on the channel length associated with a the RF burst(s).

20. The method of claim 15, wherein received RF bursts are associated with an interfering Eight Phase Shift Keying (8PSK)/GMSK wireless communication.

* * * * *